(12) United States Patent
Neuman et al.

(10) Patent No.: US 10,675,845 B2
(45) Date of Patent: Jun. 9, 2020

(54) BIODEGRADABLE SHEETS

(71) Applicant: Tipa Corp. Ltd, Hod Hasharon (IL)

(72) Inventors: Tal Neuman, Ramot Ha'shavim (IL); Nili Konieczny, Tel Aviv (IL); Itai Pelled, Ramat Hasharon (IL)

(73) Assignee: Tipa Corp. Ltd., Hod Hasharon (IL)

( * ) Notice: Subject to any disclaimer, the term of this patent is extended or adjusted under 35 U.S.C. 154(b) by 199 days.

(21) Appl. No.: 15/521,921

(22) PCT Filed: Oct. 27, 2015

(86) PCT No.: PCT/IL2015/051050
§ 371 (c)(1),
(2) Date: Apr. 26, 2017

(87) PCT Pub. No.: WO2016/067285
PCT Pub. Date: May 6, 2016

(65) Prior Publication Data
US 2018/0281359 A1    Oct. 4, 2018

Related U.S. Application Data

(60) Provisional application No. 62/069,039, filed on Oct. 27, 2014.

(51) Int. Cl.
*B32B 27/08*    (2006.01)
*B32B 27/30*    (2006.01)
(Continued)

(52) U.S. Cl.
CPC ............ *B32B 27/08* (2013.01); *B32B 27/22* (2013.01); *B32B 27/306* (2013.01); *B32B 27/36* (2013.01);
(Continued)

(58) Field of Classification Search
None
See application file for complete search history.

(56) References Cited

U.S. PATENT DOCUMENTS 3,920,624 A * 11/1975 Humkey ............... B01D 3/38
528/501
4,409,167 A * 10/1983 Kolouch ............ C08G 18/4063
264/102
(Continued)

FOREIGN PATENT DOCUMENTS

EP        1 008 629       6/2000
WO    WO 2011/158240    12/2011
(Continued)

OTHER PUBLICATIONS

Gregorova, Ing. Adriana. "Physical Properties Biodegradable Polymers." (2013). (Year: 2013).*
(Continued)

*Primary Examiner* — Vivian Chen
(74) *Attorney, Agent, or Firm* — Pearl Cohen Zedek Latzer Baratz LLP

(57) ABSTRACT

The present invention relates to a biodegradable sheet comprising at least two polymer layers, wherein a first polymer layer comprises a mixture of at least two different biodegradable polymers selected from the group consisting of PLA, PCL, PBS and PBSA; and wherein a second polymer layer comprises a biodegradable polymer selected from the group consisting of PBS, PBSA, a mixture of PLA and PBS, and a mixture of PLA and PBSA.

14 Claims, 4 Drawing Sheets

(51) Int. Cl.

| | |
|---|---|
| *B32B 27/36* | (2006.01) |
| *B32B 27/22* | (2006.01) |
| *B32B 15/09* | (2006.01) |
| *C08L 67/03* | (2006.01) |
| *C08L 67/04* | (2006.01) |
| *C08L 67/02* | (2006.01) |
| *C08L 67/00* | (2006.01) |
| *C08K 5/00* | (2006.01) |
| *C09D 193/02* | (2006.01) |
| *C09D 101/02* | (2006.01) |
| *C09D 127/06* | (2006.01) |

(52) U.S. Cl.
CPC ............ *B32B 15/09* (2013.01); *B32B 27/30* (2013.01); *B32B 27/304* (2013.01); *B32B 2250/03* (2013.01); *B32B 2250/244* (2013.01); *B32B 2250/40* (2013.01); *B32B 2255/10* (2013.01); *B32B 2255/20* (2013.01); *B32B 2255/205* (2013.01); *B32B 2255/26* (2013.01); *B32B 2255/28* (2013.01); *B32B 2270/00* (2013.01); *B32B 2307/7163* (2013.01); *B32B 2367/00* (2013.01); *B32B 2439/06* (2013.01); *C08K 5/0016* (2013.01); *C08L 67/00* (2013.01); *C08L 67/02* (2013.01); *C08L 67/03* (2013.01); *C08L 67/04* (2013.01); *C09D 101/02* (2013.01); *C09D 127/06* (2013.01); *C09D 193/02* (2013.01); *Y10T 428/1338* (2015.01); *Y10T 428/1341* (2015.01); *Y10T 428/1352* (2015.01); *Y10T 428/1355* (2015.01); *Y10T 428/1379* (2015.01); *Y10T 428/1383* (2015.01); *Y10T 428/3179* (2015.04); *Y10T 428/31681* (2015.04); *Y10T 428/31786* (2015.04); *Y10T 428/31797* (2015.04); *Y10T 428/31844* (2015.04)

(56) References Cited

U.S. PATENT DOCUMENTS

| | | | | |
|---|---|---|---|---|
| 4,457,977 | A * | 7/1984 | Walles | C08J 7/045 427/306 |
| 4,863,983 | A * | 9/1989 | Johnson | C08L 23/02 524/140 |
| 5,451,611 | A * | 9/1995 | Chilukuri | C08J 11/24 521/48.5 |
| 5,882,747 | A * | 3/1999 | Bria | A63H 27/10 428/35.2 |
| 5,883,199 | A * | 3/1999 | McCarthy | A61L 15/26 428/35.2 |
| 5,910,545 | A * | 6/1999 | Tsai | A61F 13/15252 525/178 |
| 5,939,467 | A * | 8/1999 | Wnuk | A61L 15/62 523/124 |
| 6,063,465 | A * | 5/2000 | Charbonneau | C08G 63/668 264/209.1 |
| 6,201,034 | B1 * | 3/2001 | Warzelhan | C08G 18/4216 521/138 |
| 7,320,773 | B2 * | 1/2008 | Egawa | B32B 9/02 264/331.11 |
| 7,714,048 | B2 * | 5/2010 | Goino | C08K 5/0075 428/34.1 |
| 7,811,669 | B2 * | 10/2010 | Fujii | C23C 14/0021 427/255.18 |
| 9,228,079 | B2 * | 1/2016 | Neuman | B32B 27/08 |
| 9,751,285 | B2 * | 9/2017 | Neuman | B65D 65/463 |
| 9,884,471 | B2 * | 2/2018 | Neuman | B32B 27/08 |
| 10,239,292 | B2 * | 3/2019 | Nissenbaum | B65D 65/46 |
| 2002/0028857 | A1 * | 3/2002 | Holy | B29C 49/00 523/124 |
| 2002/0050124 | A1 * | 5/2002 | Jaeger | B29D 7/01 53/441 |
| 2002/0065345 | A1 * | 5/2002 | Narita | B32B 27/10 524/271 |
| 2002/0094444 | A1 * | 7/2002 | Nakata | B32B 27/36 428/480 |
| 2003/0039851 | A1 * | 2/2003 | Hale | B32B 27/08 428/480 |
| 2005/0137332 | A1 * | 6/2005 | Hale | C08L 67/02 525/66 |
| 2005/0288452 | A1 * | 12/2005 | Wakaki | C08L 67/00 525/450 |
| 2006/0040119 | A1 * | 2/2006 | Egawa | B32B 9/02 428/480 |
| 2006/0286373 | A1 * | 12/2006 | Egawa | B32B 27/08 428/339 |
| 2008/0274316 | A1 * | 11/2008 | Griffith | C08K 3/22 428/35.7 |
| 2008/0311813 | A1 * | 12/2008 | Ting | B32B 7/12 442/327 |
| 2009/0018235 | A1 * | 1/2009 | Nascimento | C08L 67/04 523/128 |
| 2009/0162683 | A1 * | 6/2009 | Douard | C08K 5/42 428/480 |
| 2010/0323196 | A1 * | 12/2010 | Dou | B32B 27/08 428/349 |
| 2011/0045215 | A1 * | 2/2011 | Atis | B65D 43/0222 428/34.1 |
| 2011/0097530 | A1 * | 4/2011 | Gohil | B32B 27/08 428/36.92 |
| 2011/0311743 | A1 * | 12/2011 | Kaneko | C08J 5/18 428/35.5 |
| 2012/0177859 | A1 * | 7/2012 | Gavel | G09F 3/10 428/41.8 |
| 2012/0238673 | A1 * | 9/2012 | Longdon | C08L 1/12 524/41 |
| 2012/0288693 | A1 * | 11/2012 | Stanley | B32B 7/12 428/213 |
| 2013/0087560 | A1 * | 4/2013 | Neuman | B32B 27/08 220/23.83 |
| 2013/0231440 | A1 * | 9/2013 | Alidedeoglu | C08G 18/73 524/537 |
| 2013/0261198 | A1 * | 10/2013 | Alidedeoglu | C08J 11/24 521/48.5 |
| 2013/0344264 | A1 * | 12/2013 | Chicarella | B32B 27/36 428/34.7 |
| 2014/0087106 | A1 * | 3/2014 | Law | C08L 3/02 428/35.5 |
| 2014/0147604 | A1 * | 5/2014 | Nevalainen | D21H 27/10 428/34.2 |
| 2014/0148514 | A1 * | 5/2014 | Alidedeoglu | C08G 63/78 514/772.3 |
| 2014/0329039 | A1 * | 11/2014 | Neuman | B32B 27/08 428/36.6 |
| 2015/0073079 | A1 * | 3/2015 | Suzuki | C08J 5/18 524/317 |
| 2015/0174867 | A1 * | 6/2015 | Neuman | B65D 65/463 428/451 |
| 2015/0175759 | A1 * | 6/2015 | Neuman | B32B 27/08 383/1 |
| 2015/0284133 | A1 * | 10/2015 | Nevalainen | B29C 48/21 206/557 |
| 2015/0337094 | A1 * | 11/2015 | Wong | B32B 5/022 524/35 |
| 2016/0257098 | A1 * | 9/2016 | Nissenbaum | B65D 65/46 |
| 2018/0186129 | A1 * | 7/2018 | Neuman | B32B 27/08 |

FOREIGN PATENT DOCUMENTS

| | | | |
|---|---|---|---|
| WO | WO 2011/158240 | A * | 12/2011 |
| WO | WO 2013/007872 | | 1/2013 |
| WO | WO 2013/088443 | * | 6/2013 |
| WO | WO 2013/186778 | | 12/2013 |
| WO | WO 2014/064335 | | 5/2014 |

(56) References Cited

FOREIGN PATENT DOCUMENTS

WO    WO 2015/042641 A  *  4/2015
WO    WO 2015/059709      4/2015

OTHER PUBLICATIONS

International Search Report for International App. No. PCT/IL2015/051050 dated Feb. 18, 2016.

* cited by examiner

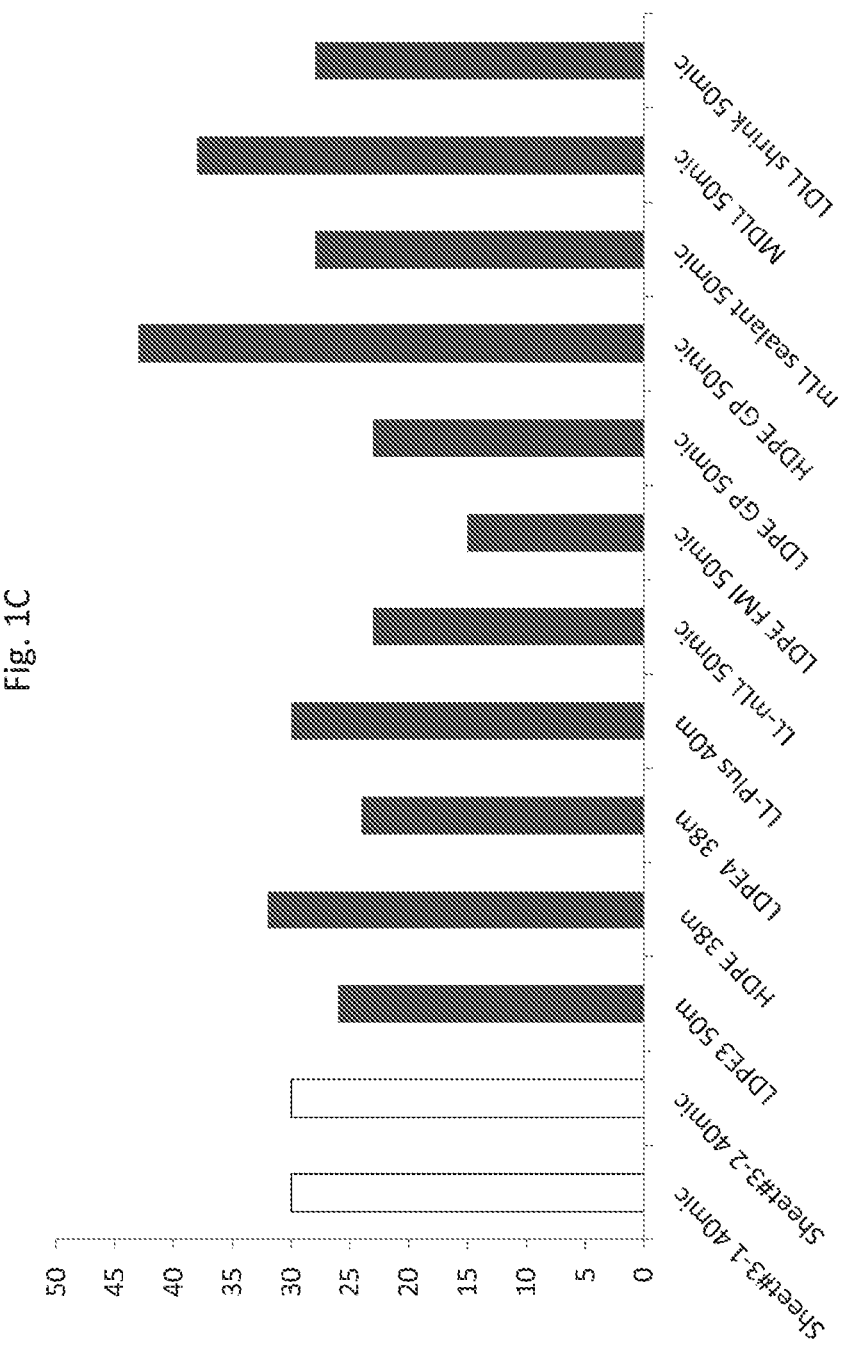

ID SHEETS

CROSS-REFERENCE TO RELATED APPLICATIONS

This application is a National Phase Application of PCT International Application No. PCT/IL2015/051050, International Filing Date Oct. 27, 2015, published as WO 2016/067285 on May 6, 2016, claiming the benefit of U.S. Provisional Patent Application No. 62/069,039, filed Oct. 27, 2014, which are hereby incorporated by reference.

FIELD OF THE INVENTION

The present invention is directed to biodegradable sheets comprising at least two different polymer layers, wherein a first polymer layer comprises a mixture of at least two different biodegradable polymers selected from the group consisting of PLA, PCL, PBS and PBSA; and wherein a second polymer layer comprises a biodegradable polymer selected from the group consisting of PBS, PBSA, a mixture of PLA and PBS, and a mixture of PLA and PBSA.

The present invention is further directed to a biodegradable sheet comprising at least three polymer layers, wherein a first polymer layer and a second polymer layer comprise PBS; wherein a third polymer layer comprises PBAT; and wherein the third polymer layer is positioned between the first polymer layer and the second polymer layer.

BACKGROUND OF THE INVENTION

The use of biodegradable materials had increased over the past years due to the environmentally beneficial properties of such materials. Such materials are now commonly used in the manufacture of a wide range of products, including various types of plastic bags and other forms of packaging. In response to the demand for more environmentally friendly packaging materials, a number of new biopolymers have been developed that have been shown to biodegrade when discarded into the environment.

Examples of such polymers include polyesteramide (PEA), modified polyethylene terephthalate (PET), biopolymers based on polylactic acid (PLA), polyhydroxyalkanoates (PHA), which include polyhydroxybutyrate (PHB), polyhydroxyvalerate (PHV) and polyhydroxybutyrate-hydroxyvalerate copolymer (PHBV), and poly (epsilon-caprolactone) (PCL).

Each of the foregoing biopolymers has unique properties, benefits and weaknesses. For example, modified PET, PEA, PHB and PLA tend to be strong but are also quite rigid or even brittle. This makes them poor candidates when flexible sheets are desired, such as for use in making wraps, bags and other packaging materials requiring good bend and folding capability.

On the other hand, biopolymers such as PHBV and polybutylene adipate terphtalate (PBAT) are many times more flexible than the biopolymers discussed above, but have relatively low melting points so that they tend to be self-adhering and unstable when newly processed and/or exposed to heat.

Further, due to the limited number of biodegradable polymers, it is often difficult, or even impossible, to identify a single polymer or copolymer that meets all, or even most, of the desired performance criteria for a given application. For these and other reasons, biodegradable polymers are not as widely used in the area of food packaging materials, particularly in the field of liquid receptacles, as desired for ecological reasons.

In addition, the biodegradable sheets known today are mostly opaque, having low light transmittance and high haze. Further, the known biodegradable sheets either do not include barrier layers or include amounts and types of barrier layers that cause the sheets to be generally highly permeable to gases, having both a high oxygen transmission rate (OTR) and a high water vapor transmission rate (WVTR), and thus they cannot serve as long term food or drink receptacles. Additionally, the physical strength of known biodegradable sheets, measured by parameters such as stress at maximum load, strain at break and Young's Modulus, is lacking and, therefore, such sheets are deficient when used as packaging, particularly for packaging liquids.

International Patent Publication No. WO 2011/158240 to the assignee of the present application discloses biodegradable sheets and an array of separable pouches for liquids.

International Patent Publication No. WO 2013/088443 to the assignee of the present application discloses biodegradable sheets comprising a gas barrier material, which is a nanoclay and/or polyvinyl alcohol.

International Patent Publication No. WO 2013/186778 to the assignee of the present application discloses biodegradable sheets comprising at least one layer which comprises a biodegradable polymer and surface treated nanoclay particles and/or polyvinyl alcohol (PVOH) grafted with a crosslinker and polybutylene succinate (PBS) or polybutylene succinate adipate (PBSA).

International Patent Publication No. WO2015/059709 to the assignee of the present application discloses biodegradable sheets comprising a contact layer.

Although there have been some advances in the field of biodegradable packaging, there remains a need for flexible and biodegradable packaging with improved impermeability to water vapor and/or oxygen.

SUMMARY OF THE INVENTION

In one aspect, the present invention is directed to biodegradable sheets comprising at least two polymer layers, wherein a first polymer layer comprises a mixture of at least two different biodegradable polymers selected from the group consisting of PLA, PCL, PBS and PBSA; and wherein a second polymer layer comprises a biodegradable polymer selected from the group consisting of PBS, PBSA, a mixture of PLA and PBS, and a mixture of PLA and PBSA.

The present invention further provides a biodegradable sheet comprising at least three polymer layers, wherein a first polymer layer and a second polymer layer comprise PBS; wherein a third polymer layer comprises PBAT; and wherein the third polymer layer is positioned between the first polymer layer and the second polymer layer.

In some embodiments, any of the biodegradable sheets disclosed herein is prepared by co-extrusion of at least two different polymer layers.

Further provided herein are any of the biodegradable sheets disclosed herein above wherein at least one polymer layer is coated with one or more of a metal coating, shellac coating, a cellulose-based coating or a plasma deposited siloxane based coating, imparting upon the sheet advantageous impermeability and sealing properties.

The present invention further provides a multilayered laminated structure comprising the biodegradable sheet according to any of the embodiments disclosed herein, and at least one additional layer attached to the biodegradable sheet by lamination. The biodegradable sheets according to the invention can be used to manufacture a wide variety of articles of manufacture, including articles useful for packaging solid, semi-solid or liquid substances, including ingestible substances, such as food substances, drinks and medicines.

Besides being able to biodegrade, it is often important for a polymer or polymer blend to exhibit certain physical properties. The intended application of a particular polymer blend will often dictate which properties are necessary in order for a particular polymer blend, or article manufactured there from, to exhibit the desired performance criteria. When relating to biodegradable sheets for use as packaging materials, particularly as liquid receptacles, performance criteria may include measurements for strain at break, Young's modulus and stress at maximum load. Other performance criteria may include assessment of one or more of sealability, water transmission and oxygen transmission.

In a second aspect, provided herein are single layered or multilayered biodegradable sheets with at least one layer that is coated with one or more of a metal coating, shellac coating, a cellulose-based coating, a polyvinylidene chloride (PVDC) coating and a plasma deposited siloxane based coating that exhibits advantageous impermeability expressed as reduced water vapor transmission rate (WVTR) and/or oxygen transmission rate (OTR), with improved sealing properties as compared to prior art biodegradable sheets, and direct contact with liquids. Such sheets maintain the mechanistic features of flexible sheets as well as the ecologically desired biodegradability and compostability and/or bio-based properties.

In some embodiments, the biodegradable polymer is selected from the group consisting of poly(epsilon-caprolactone) (PCL), polydioxanone (PDO), polyglycolic acid (PGA), polybutylene succinate (PBS), polybutylene succinate adipate (PBSA), polylactic acid (PLA), polybutylene adipate terphtalate (PBAT), polyvinyl alcohol (PVOH), a polyhydroxyalkanoate (PHA) such as polyhydroxyvalerate (PHV), polyhydroxybutyrate (PHB) or polyhydroxybutyrate-hydroxyvalerate copolymer (PHBV); and any mixture thereof.

In some embodiments, the biodegradable polymer is selected from the group consisting of PBS, PBSA, PLA, PBAT, PVOH, PCL and any mixture thereof. In some embodiments, the biodegradable polymer is a mixture of biodegradable polymers selected from the group consisting of a mixture of PLA and PBS, a mixture of PLA and PBSA, a mixture of PLA and PBAT.

In certain embodiments, the mixture of biodegradable polymers is a mixture of PLA and PBSA or PLA and PBS, for example wherein the PLA and PBSA or PLA and PBS are present in a w/w ratio of about 1:10 to 5:1.

In some embodiments of the sheets, the sheet comprises at least one layer wherein the mixture of biodegradable polymers further comprises PCL, a PHA or a mixture thereof. In some embodiments, the at least one layer comprises PCL. In certain embodiments, the biodegradable polymers comprise a mixture of PBS and PCL, a mixture of PLA and PCL, a mixture of PBSA and PCL, a mixture of PBAT and PCL, a mixture of PBSA, PBS and PCL, a mixture of PBS, PLA and PCL, or a mixture of PLA, PBAT and PCL. In some embodiments, the at least one layer further comprises a chain extender.

In some embodiments, provided herein is a multilayered laminated structure comprising the biodegradable sheets according to any of the embodiments disclosed herein, and at least one additional layer attached to the biodegradable sheet by lamination.

In some embodiments, the laminated biodegradable polymer sheet is a multilayered laminated biodegradable polymer sheet. In various embodiments, the laminated biodegradable polymer sheet comprises a biodegradable polymer selected from the group consisting of poly(epsilon-caprolactone) (PCL) polyhydroxybutyrate (PHB), polydioxanone (PDO), polyglycolic acid (PGA), polybutylene succinate (PBS), polybutylene succinate adipate (PBSA), poly lactic acid (PLA), polybutylene adipate terphtalate (PBAT), polyhydroxyalkanoate (PHA), polyhydroxyvalerate (PHV), polyvinyl alcohol (PVOH) and polyhydroxybutyrate-hydroxyvalerate copolymer (PHBV); and any mixture thereof. The laminated sheet may include a biodegradable polymer selected from the group consisting of PBS, PBSA, PLA, PBAT, PCL, PHA, PVOH and any mixture thereof. For example, the biodegradable polymer is a mixture of biodegradable polymers selected from the group consisting of a mixture of PLA and PBS, a mixture of PLA and PBSA, a mixture of PLA and PBAT, a mixture of PBS and PCL, a mixture of PLA and PCL, a mixture of PBSA and PCL, a mixture of PBAT and PCL, a mixture of PBSA, PBS and PCL, a mixture of PBS, PLA and PCL, and a mixture of PLA, PBAT and PCL.

In some embodiments, the mixture of biodegradable polymers is a mixture of PLA and PBSA or PLA and PBS, and wherein the PLA and PBSA or PLA and PBS are present in a w/w ratio of about 1:10 to 5:1. In other embodiments, the mixture of biodegradable polymers comprises PBSA, PBS and PCL. In yet other embodiments, the mixture of biodegradable polymers comprises PLA, PBS and PCL. In yet other embodiments, the mixture of biodegradable polymers comprises PLA, PBAT and PCL. The laminated biodegradable polymer sheet may further comprise a chain extender.

In some embodiments of the biodegradable sheet, the laminated biodegradable sheet is selected from the group consisting of:
a) A three-layered biodegradable sheet of about 15-60 microns thick comprising about 16.3% w/w PLA and 83.7% w/w PBSA; wherein
Layer 1 comprises about 25% PLA and about 75% PBSA;
Layer 2 comprises 100% PBSA; and
Layer 3 comprises about 25% PLA and about 75% PBSA;
b) A three-layered biodegradable sheet of about 15-60 microns thick comprising about 16.3% w/w PLA and 83.7% w/w PBSA; wherein
Layer 1 comprises about 25% PLA and about 75% PBSA;
Layer 2 comprises about 25% PLA and about 75% PBSA; and
Layer 3 comprises 100% PBSA;
c) A three layered biodegradable sheet of about 15-60 microns thick wherein
Layer 1 comprises about 25% PLA and about 75% PBSA;
Layer 2 comprises 100% PBAT; and
Layer 3 comprises about 100% PBSA;
d) The three layered biodegradable sheet of (a-c) further comprising a nitrocellulose or shellac coating;
e) The three layered biodegradable sheet of (a-c) further comprising a nitrocellulose coating and further comprising a shellac coating on the nitrocellulose coat;
f) An aluminum metalized biodegradable PLA sheet of about 20 microns thick;
g) A biodegradable sheet comprising 10% w/w PLA and 90% w/w PBAT;

h) An aluminum metalized three layered biodegradable sheet of (a or b)
i) An aluminum metalized single layer biodegradable PBS sheet about 20-30 microns thick;
j) An aluminum metalized single layer biodegradable PBS sheet about 20-30 microns thick, further comprising a nitrocellulose coating on the metalized side;
k) An aluminum metalized single layer biodegradable PBS sheet about 20-30 microns thick, further comprising a shellac coating on the metalized side;
l) An aluminum metalized single layer biodegradable PBS sheet about 20-30 microns thick, further comprising a shellac coating on the both sides (see data in Sheet #52);
m) A single layer biodegradable PBS sheet about 15-100 microns thick comprising a nitrocellulose coating;
n) An aluminum metalized three layered biodegradable sheet about 15-100 microns thick wherein
Layer 1 comprises about 100% PBS;
Layer 2 comprises about 100% PBAT; and
Layer 3 comprises about 100% PBS;
o) The three layered biodegradable sheet of (n) further comprising a nitrocellulose coating on the metalized side;
p) The three layered biodegradable sheet of (n) further comprising a shellac coating on the metalized side;
q) The three layered biodegradable sheet of (n) further comprising a shellac coating on both sides;
r) The three layered biodegradable sheet of (n) further comprising a nitrocellulose coating on both sides;
s) The three layered biodegradable sheet of 15-100 microns thick comprising
Layer 1: consisting of about 75% w/w PBSA and about 25% w/w PLA;
Layer 2: consisting of about 100% w/w PHA; and
Layer 3: consisting of about 100% w/w PBSA;
t) The three layered biodegradable sheet of (s) further comprising a nitrocellulose coating on the metalized side;
u) The three layered biodegradable sheet of (s) further comprising a shellac coating on the metalized side;
v) The three layered biodegradable sheet of (s) further comprising a shellac coating on both sides;
w) The three layered biodegradable sheet of (s) further comprising a nitrocellulose coating on both sides;
x) The three layered biodegradable sheet of 15-100 microns thick comprising
Layer 1: consisting of about 75% w/w PBSA and about 25% w/w and chain extender;
Layer 2: consisting of about 100% w/w PVOH and chain extender; and
Layer 3: consisting of about 75% w/w PBSA and about 25% w/w PLA and chain extender; or
y) The three layered biodegradable sheet of (x) further comprising a plasma deposition of siloxane mixture.
z) A bi-layered biodegradable sheet (15-100 microns thick) was prepared according to the procedure described for c (in Examples), wherein at the co-extrusion step included 200 g of PBS and 200 g of PHA, and having the following layers;
Layer 1: consisting of about 100% w/w PBS; and
Layer 2: consisting of about 100% w/w PHA.
Z1) A bi-layered biodegradable sheet (15-100 microns thick) was prepared according to the procedure described for Sheet #70, wherein the co-extrusion step included the addition of 600 g PLA and 400 g PCL, and having the following layers:
Layer 1: consisting of about 60% w/w PLA and about 40% w/w PCL;
Layer 2: consisting of about 100% w/w PBS.

Z2) A three-layered biodegradable sheet (15-100 microns thick) consisting of PBSA (75%):PLA (25%) compound and PBSA was prepared according to the procedure described for Sheet #71, wherein the co-extrusion step included the addition of 300 g PBSA (75%):PLA (25%) compound and 200 g PBSA, and having the following layers:
Layer 1: consisting of about 100% w/w PBSA;
Layer 2: consisting of about 75% w/w PBSA and about 25% w/w PLA; and
Layer 3: consisting of about 100% w/w PBSA.
Z3) A three-layered biodegradable sheet (15-100 microns thick) consisting of PBAT and a hydrophobic compound, consisting of about 60% w/w PLA, and 40% w/w PCL was prepared according to the procedure described for Sheet #74, wherein the co-extrusion step included the addition of 2 kg PBAT and 1 kg hydrophobic compound (60% w/w PLA and 40% w/w PCL), and having the following layers:
Layer 1: consisting of about 60% w/w PLA and about 40% w/w PCL;
Layer 2: consisting of about 100% w/w PBAT;
Layer 3: consisting of about 60% w/w PLA and about 40% w/w PCL.
Z4) A three-layered biodegradable sheet (15-100 microns thick) consisting of PBS and PLA was prepared according to the procedure described for Sheet #75, wherein the co-extrusion step included the addition of 1 kg PBS and 1 kg PLA, and having the following layers:
Layer 1: consisting of about 100% w/w PBS;
Layer 2: consisting of about 100% w/w PBS;
Layer 3: consisting of about 100% w/w PLA;
Z5) A three-layered biodegradable sheet (15-100 microns thick) consisting of PBS and a hydrophobic compound, consisting of about 60% w/w PLA, and 40% w/w PCL and PBS1 was prepared according to the procedure described for Sheet #76, wherein the co-extrusion step included the addition of 1 kg PBS and 2 kg hydrophobic compound (60% w/w PLA and 40% w/w PCL) and 1 kg PBSA, and having the following layers:
Layer 1: consisting of about 100% w/w PBS;
Layer 2: consisting of about 60% w/w PLA and about 40% w/w PCL;
Layer 3: consisting of about 100% w/w PBSA.

In some embodiments of the biodegradable sheet disclosed herein, the sheet is from 15 microns to 120 microns thick.

In some embodiments of the biodegradable sheet was prepared according to the procedure described for Sheet #74 or #76, wherein the co-extrusion step included addition of impact modifier (plasticizer) up to 5% w/w with the polymer.

Further provided herein is a method of using the biodegradable sheets disclosed herein as a packaging for a liquid or solid material, where reduced water and/or oxygen permeability is desired. In various embodiments, the biodegradable sheet disclosed herein has a WVTR of about 1 to 100 g/m$^2$*d or less and OTR of about 1 to 100 cm$^3$/(m$^2$×d×bar) or less, comprising the step of manufacturing the sheet with at least one layer comprising about 5% w/w to about 45% w/w, about 20% w/w to about 45% w/w or about 25% to about 40% of a first hydrophobic polymer selected from the group consisting of PCL, PHA and a mixture thereof and a second hydrophobic polymer of mixture of hydrophobic polymer such as a mixture of PBS and PBSA, a mixture of PBS and PLA, a mixture of PBSA and PLA, or a mixture of PBAT and PLA, in an amount of about 95% w/w to about 55% w/w.

In some embodiments, the biodegradable sheet comprises two or more layers. In some embodiments, the contact layer comprises PCL. In some embodiments, the contact layer comprises about 5% w/w to about 45% w/w, about 20% w/w to about 45% w/w or about 25% to about 40% of a first hydrophobic polymer selected from the group consisting of PCL, PHA and a mixture thereof and about 95% w/w to about 55% w/w of a second hydrophobic polymer selected from the group consisting of PBS, PBSA, PLA, PBAT and a mixture thereof.

The methods, uses, materials, and examples detailed herein are illustrative only and are not intended to be limiting; materials, uses and methods similar or equivalent to those described herein can be used in practice or testing of the invention. Other features and advantages of the invention will be apparent from the following detailed description, and from the claims.

BRIEF DESCRIPTION OF THE FIGURES

FIGS. 1A-1D are graphs that represent physical properties of an exemplary sheet, sheet #3 (Example 1, Table 1) from two production campaigns (1 and 2). The sheets were compared to those of a wide range of non-biodegradable, commercial polyethylene films, which are commonly used in the packaging industry. (1A) Impact was measured using the ASTM D1709 Standard Test Method for Impact Resistance of Plastic Film by the Free-Falling Dart. (1B) Haze was measured using the ASTM D1003-07e1 Standard Test Method for Haze and Luminous Transmittance of Transparent Plastics, and (1C) ultimate tensile strength (UTS) and (1D) Young's Modulus were measured using the ASTM D882-10 Standard Test Method for Tensile Properties of Thin Plastic Sheeting.

DETAILED DESCRIPTION OF THE INVENTION

Definitions

Figure 1A:
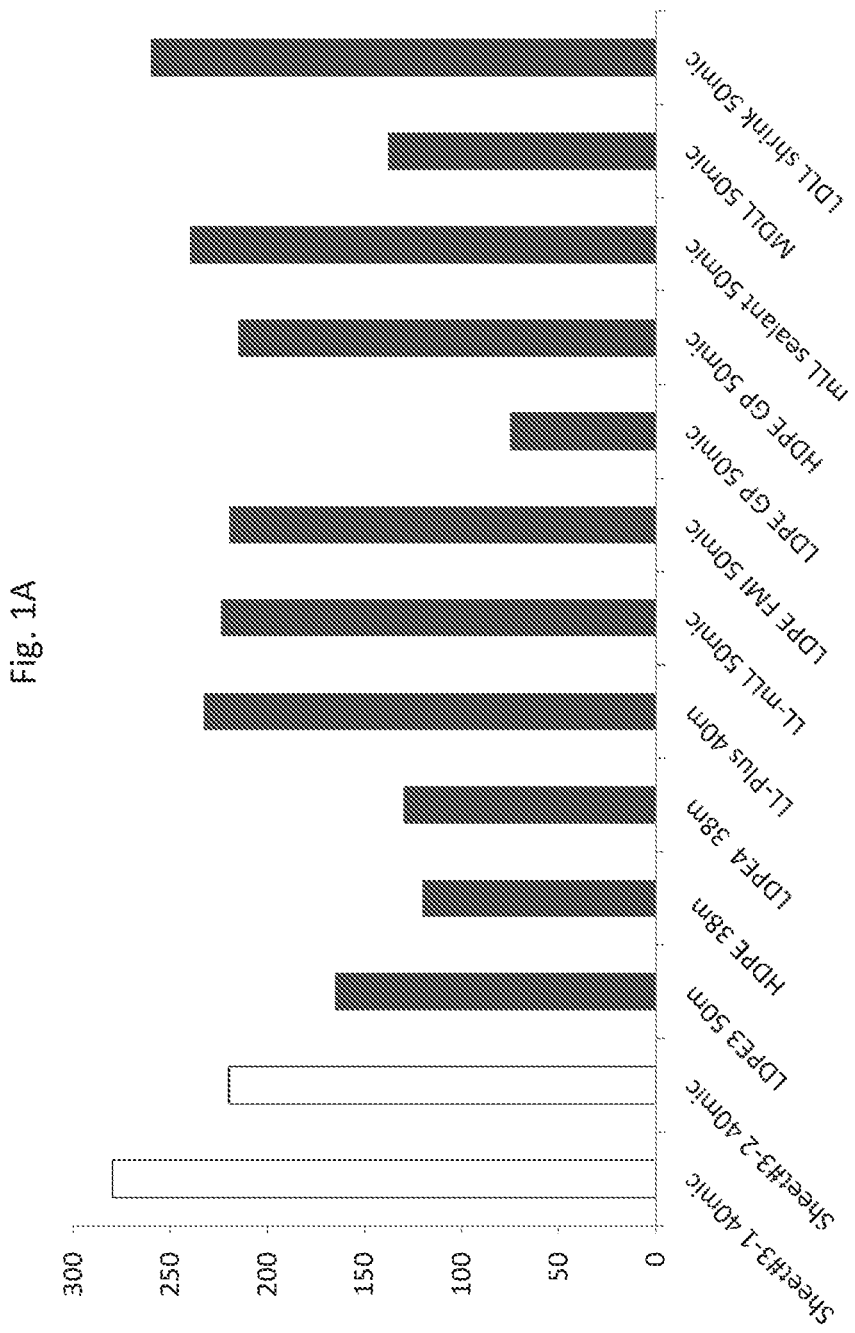

Unless otherwise defined, all technical and scientific terms used herein have the same meaning as commonly understood by one of ordinary skill in the art to which the invention pertains. In case of conflict, the specification, including definitions, takes precedence.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "biodegradable" as used herein is to be understood to include a polymer, polymer mixture, or polymer-containing sheet that degrades through the action of living organisms, air, water or any combinations thereof within 180 days in a controlled-condition industrial compost facility with high ventilation and controlled humidity. Biodegradable polymer degradation typically proceeds initially by hydrolysis, to eventually break the polymer into short oligomers, and subsequently by microbial degradation, or microbial digestion.

The term "sheet" as used herein is to be understood as having its customary meanings as used in the thermoplastic and packaging arts and includes the term "film". Such sheets may have any suitable thickness, may be of a single polymer layer or of multiple polymer layers. Such sheets may be manufactured using any suitable method including blown film extrusion and cast film extrusion. The sheets according to this invention include sheets having a wide variety of thicknesses (both measured and calculated) and layers, for example 2, 3, 4, 5, 7 or more layers. A sheet may be generated by methods known in the art, for example, co-extrusion casting and blow molding.

As known in the art, multilayer sheets are produced by co-extrusion, lamination or combination thereof. In lamination, at least two previously-made sheets are mutually adhered, for example by heat, pressure and/or adhesive.

A sheet may be a laminate generated by fixing two or more sheets to each other at their surface with adhesives. A "laminate" as used herein is to be understood as having its customary meanings as used in the thermoplastic and packaging arts and refers to a sheet comprising two or more layers that have been assembled by, for example, heat, pressure and or adhesive.

A "tie layer" refers to a polymer layer that bonds to both polar and non-polar polymers that is typically used to produce a sheet having at least three coextruded layers: a layer of polar polymer, a layer of non-polar polymer and the tie layer therebetween. Tie layer resins are commercially available and typically include, in a non-limiting manner, adhesive resins including anhydride-modified polymers resins, such as, for example, 1,4-benzenedicarbonyl thiourea resin, BTR-8002P (Nippon Gohsei).

The terms "particle" or "particulate filler" should be interpreted broadly to include filler particles having any of a variety of different shapes and aspect ratios. In general, "particles" are those solids having an aspect ratio (i.e., the ratio of length to thickness) of less than about 10:1. A Solid having an aspect ratio greater than about 10:1 may be better understood as a "fiber", a term will be defined and discussed herein below.

The term "fiber" should be interpreted as a solid having an aspect ratio greater than at least about 10:1. Therefore, fibers are better able to impart strength and toughness than particulate fillers. As used herein, the terms "fibers" and "fibrous material" include both inorganic fibers and organic fibers.

A "chain extender" refers to short molecules or monomers with several functional groups that allow to attach chemically to the terminal edge of polymer chains in order to add additional chains to improve various properties like molecular weight and mechanical properties. In some embodiments, the chain extender is a styrene-acrylic epoxy-based chain extender.

A "plasticizer" refers to additives such as short polymers or oligomers, which increase the plasticity or fluidity of a material. In some embodiments, the plasticizer is PCL.

The term "cellulose" is used herein to refer to as nitro-cellulose or nano-crystalline cellulose. In some embodiments, the nano-crystalline cellulose is applied to plasma pre-treated plasma films.

It is to be noted that, as used herein, the singular forms "a", "an" and "the" include plural forms unless the content clearly dictates otherwise. Where aspects or embodiments are described in terms of Markush groups or other grouping of alternatives, those skilled in the art will recognize that the invention is also thereby described in terms of any individual member or subgroup of members of the group.

As used herein, when a numerical value is preceded by the term "about", the term "about" is intended to indicate +/−10%.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As known to a person having ordinary skill in the art, some of the polymers discussed herein have one or more names or spelling thereof. For example, poly(epsilon-caprolactone), poly(caprolactone) and polycaprolactone are synonymous and the three terms are used interchangeably. Similarly, polylactic acid and poly(lactic acid) are synonymous.

Biodegradable Sheets

According to an aspect of some embodiments of the present invention, there is provided a biodegradable sheet comprising at least two polymer layers, wherein a first polymer layer comprises a mixture of at least two different biodegradable polymers selected from the group consisting of PLA, PCL, PBS and PBSA; and wherein a second polymer layer comprises a biodegradable polymer selected from the group consisting of PBS, PBSA, a mixture of PLA and PBS, and a mixture of PLA and PBSA. In some embodiments, the sheets may contain a third layer or one or more additional layers that may comprise PCL, PBAT, PVOH or any combination thereof. In some embodiments, one or more of the first, the second, the third layer or of the one or more additional layer or any combination thereof may further comprise a plasticizer and/or a chain extender.

In some embodiments, the first polymer layer and the second polymer layer are the same. In other embodiments, the first polymer layer and second polymer layer are different.

In some embodiments, the first polymer layer comprises a mixture of PLA and PCL; and the second polymer layer comprises PBS. In some such embodiments, the first polymer layer comprises PLA at a concentration of from about 50 to about 70% (w/w) of the mixture and PCL at a concentration of from about 30 to about 50% (w/w) of the mixture. In some embodiments, the first polymer layer comprises PLA at a concentration of from 55% to about 65% (w/w) of the mixture and PCL at a concentration of from about 35% to about 45% (w/w) of the mixture and the second polymer layer comprises PBS.

In some embodiments, the first polymer layer comprises PLA at a concentration of about 60% (w/w) of the mixture and PCL at a concentration of about 40% (w/w) of the mixture and the second polymer layer comprises PBS.

In some embodiments, the first polymer layer comprises a mixture of PBSA and PLA. In some embodiments, the first polymer layer comprises PBSA at a concentration of from about 65 to about 85% (w/w) of the mixture and PLA at a concentration of from about 15 to about 35% (w/w) of the mixture. In some embodiments, the first polymer layer comprises PBSA at a concentration of from about 70 to about 80% (w/w) of the mixture and PLA at a concentration of from about 20 to about 30% (w/w) of the mixture. In some embodiments, the first polymer layer comprises PBSA at a concentration of about 75% (w/w) of the mixture and PLA at a concentration of about 25% (w/w) of the mixture. In some such embodiments, the second polymer layer also comprises a mixture of PBSA and PLA, wherein in some embodiments the second polymer layer comprises PBSA at a concentration of from about 65 to about 85% (w/w) of the mixture and PLA at a concentration of from about 15 to about 35% (w/w) of the mixture. In some embodiments, the second polymer layer comprises PBSA at a concentration of from about 70 to about 80% (w/w) of the mixture and PLA at a concentration of from about 20 to about 30% (w/w) of the mixture. In some embodiments, the second polymer layer comprises PBSA at a concentration of about 75% (w/w) of the mixture and PLA at a concentration of about 25% (w/w) of the mixture.

In some embodiments wherein the first polymer layer comprises a mixture of PBSA and PLA, the second polymer layer comprises PBSA.

In some embodiments, the biodegradable sheet further comprises a third polymer layer. The third layer may be situated between the first polymer layer and the second polymer layer. Alternatively, the second polymer layer may be situated between the first polymer layer and the third polymer layer.

In some embodiments, the third polymer layer comprises PBAT.

In some embodiments, the first and the second polymer layers comprise a mixture of PBSA and PLA and the third polymer layer comprises PBAT. In some embodiments, the first and the second polymer layers comprise PBSA at a concentration of from about 65 to about 85% (w/w) of the mixture and PLA at a concentration of from about 15 to about 35% (w/w) of the mixture. In some such embodiments, the third polymer layer comprises PBAT. In some embodiments, the first and the second polymer layers comprise PBSA at a concentration of from about 70 to about 80% (w/w) of the mixture and PLA at a concentration of from about 20 to about 30% (w/w) of the mixture and the third polymer layer comprises PBAT. In some embodiments, the first and the second polymer layers comprise PBSA at a concentration of about 75% (w/w) of the mixture and PLA at a concentration of about 25% (w/w) of the mixture and the third polymer layer comprises PBAT.

In one embodiment, the first and second polymer layers comprise PBSA and PLA. For example, the first polymer layer comprises PBSA at a concentration of about 75% (w/w) of the mixture and PLA at a concentration of about 25% (w/w) of the mixture; the second polymer layer comprises PBSA at a concentration of about 75% (w/w) of the mixture and PLA at a concentration of about 25% (w/w) of the mixture; and the third polymer layer, comprising PBAT, is situated between the first polymer layer and the second polymer layer.

In another embodiment, the first and second polymer layers are different. For example, the first polymer layer comprises PBSA at a concentration of about 75% (w/w) of the mixture and PLA at a concentration of about 25% (w/w) of the mixture; the second polymer layer comprises PBSA; and the third polymer layer, comprising PBAT, is optionally situated between the first polymer layer and the second polymer layer.

In some embodiments, the third polymer layer comprises PBS.

In some embodiments, the first and the second polymer layers comprise a mixture of PBSA and PLA and the third polymer layer comprises PBS. In some embodiments, the first and the second polymer layers comprise PBSA at a concentration of from about 65 to about 85% (w/w) of the mixture and PLA at a concentration of from about 15 to about 35% (w/w) of the mixture. In some such embodiments, the third polymer layer comprises PBS. In some embodiments, the first and the second polymer layers comprise PBSA at a concentration of from about 70 to about 80% (w/w) of the mixture and PLA at a concentration of from about 20 to about 30% (w/w) of the mixture and the third layer comprises PBS. In some embodiments, the first and the second polymer layers comprise PBSA at a concentration of about 75% (w/w) of the mixture and PLA at a concentration of about 25% (w/w) of the mixture and the third layer comprises PBS.

In an embodiment, the first and second polymer layers comprise PBSA and PLA and the third polymer layer comprises PBS. For example, the first polymer layer comprises PBSA at a concentration of about 75% (w/w) of the mixture and PLA at a concentration of about 25% (w/w) of the mixture; the second polymer layer comprises PBSA at a concentration of about 75% (w/w) of the mixture and PLA at a concentration of about 25% (w/w) of the mixture; and the third polymer layer, comprises PBS, and wherein the second polymer layer is optionally situated between the first polymer layer and the third polymer layer.

In some embodiments, at least one of the polymer layer of the sheets disclosed herein further comprises plasticizer and/or a chain extender, such as, for example, a styrene-acrylic epoxy-based chain extender. In some embodiments, each of the first polymer layer, the second polymer layer and the third polymer layer comprises a chain extender. In some embodiments, at least two layers comprise a chain extender and/or a plasticizer.

In some embodiments, the third polymer layer comprises PVOH and is positioned between the first polymer layer and the second polymer layer. In various embodiments, the third polymer layer consists of PVOH and a chain extender.

In some embodiments, the first and the second polymer layers comprise a mixture of PBSA and PLA and the third comprises PVOH. In some embodiments, the first and the second polymer layers comprise PBSA at a concentration of from about 65 to about 85% (w/w) of the mixture and PLA at a concentration of from about 15 to about 35% (w/w) of the mixture. In some such embodiments, the third layer comprises PVOH. In some embodiments, the first and the second polymer layers comprise PBSA at a concentration of from about 70 to about 80% (w/w) of the mixture and PLA at a concentration of from about 20 to about 30% (w/w) of the mixture and the third layer comprises PVOH. In some embodiments, the first and the second polymer layers comprise PBSA at a concentration of about 75% (w/w) of the mixture and PLA at a concentration of about 25% (w/w) of the mixture and the third layer comprises PVOH. In each of the sheets one or more of the first layer, the second layer and the third layer may further comprise a chain extender and/or a plasticizer.

Optionally, one or more of the layers of sheets described below may further comprise a chain extender and/or a plasticizer.

For example, the first polymer layer comprises PBSA at a concentration of about 75% (w/w) of the mixture and PLA at a concentration of about 25% (w/w) of the mixture and a chain extender; the second polymer layer comprises PBSA at a concentration of about 75% (w/w) of the mixture and PLA at a concentration of about 25% (w/w) of the mixture and a chain extender; and the third polymer layer, which comprises PVOH and a chain extender, is optionally positioned between the first polymer layer and the second polymer layer.

In some embodiments, the first and the second polymer layers comprise PBSA at a concentration of about 75% (w/w) of the mixture and PLA at a concentration of about 25% (w/w) of the mixture and a chain extender; and the third polymer layer, which comprises PVOH and a chain extender, is positioned between the first polymer layer and the second polymer layer.

In some embodiments, the first and second polymer layers include the compositions disclosed herein and the third polymer layer comprises a mixture of PBS, PLA and PCL. In some such embodiments, the third polymer layer comprises PBS at a concentration of from about 50 to about 60% (w/w) of the mixture, PLA at a concentration of from about 15 to about 25% (w/w) of the mixture and PCL at a concentration of from about 20 to about 30% (w/w) of the mixture. In some such embodiments, the third polymer layer comprises PBS at a concentration of about 56% (w/w) of the mixture, PLA at a concentration of about 19% (w/w) of the mixture and PCL at a concentration of about 25% (w/w) of the mixture. In some such embodiments, the second polymer layer is positioned between the first polymer layer and the third polymer layer.

In certain sheets, the first and second polymer layers include PBSA and PLA. According to one embodiment, the first polymer layer comprises PBSA at a concentration of about 75% (w/w) of the mixture and PLA at a concentration of about 25% (w/w) of the mixture; the second polymer layer comprises PBSA at a concentration of about 75% (w/w) of the mixture and PLA at a concentration of about 25% (w/w) of the mixture, the third polymer layer comprises PBS at a concentration of about 56% (w/w) of the mixture, PLA at a concentration of about 19% (w/w) of the mixture and PCL at a concentration of about 25% (w/w) of the mixture, and wherein the second polymer layer is positioned between the first polymer layer and the third polymer layer.

In some embodiments, provided herein is a biodegradable sheet comprising at least three polymer layers, wherein each of a first polymer layer and a second polymer layer independently comprises PBS, PLA and PCL; and wherein a third polymer layer comprises a polymer or polymer mixture that is different from both the first and second polymer layers.

In some embodiments, the first polymer layer comprises a mixture of PBS, PLA and PCL. In some such embodiments, the first polymer layer comprises PBS at a concentration of from about 50 to about 60% (w/w) of the mixture, PLA at a concentration of from about 15 to about 25% (w/w) of the mixture and PCL at a concentration of from about 20 to about 30% (w/w) of the mixture. In some such embodiments, the first polymer layer comprises PBS at a concentration of about 56% (w/w) of the mixture, PLA at a concentration of about 19% (w/w) of the mixture and PCL at a concentration of about 25% (w/w) of the mixture.

In some embodiments, the second polymer layer comprises a mixture of PBS, PLA and PCL. In some such embodiments, the second polymer layer comprises PBS at a concentration of from about 50 to about 60% (w/w) of the mixture, PLA at a concentration of from about 15 to about 25% (w/w) of the mixture and PCL at a concentration of from about 20 to about 30% (w/w) of the mixture. In some such embodiments, the second polymer layer comprises PBS at a concentration of about 56% (w/w) of the mixture, PLA at a concentration of about 19% (w/w) of the mixture and PCL at a concentration of about 25% (w/w) of the mixture. In some embodiments, the biodegradable sheet further comprises a third polymer layer. In some such embodiments, the third polymer layer is located between the first polymer layer and the second polymer layer. In some such embodiments, the third polymer layer comprises PVOH. In some such embodiments, the biodegradable sheet further comprises a tie layer between the first layer and the third layer and between the third layer and the second layer. In some such embodiments, the first polymer layer further comprises a coating layer comprising shellac on a surface between the first polymer layer and the third polymer layer.

The present invention further provides a biodegradable sheet comprising at least three polymer layers, wherein a first polymer layer and a second polymer layer comprise PBS; wherein a third polymer layer comprises PBAT; and wherein the third polymer layer is positioned between the first polymer layer and the second polymer layer.

In some embodiments, any of the biodegradable sheets disclosed herein is prepared by co-extrusion of at least two different polymer layers.

Further provided is a biodegradable sheet comprising at least three polymer layers, wherein
  a first polymer layer and a second polymer layer comprise PBS;
  a third polymer layer comprises PBAT; and
  wherein the third polymer layer is positioned between the first polymer layer and the second polymer layer. In some embodiments, one or more of the polymer layers further comprises a chain extender and/or a plasticizer.

Further embodiments include a biodegradable sheet comprising at least three polymer layers, wherein
  a first polymer layer comprises PBS;
  a second polymer layer comprises PBSA;
  a third polymer layer comprises a mixture of PLA and PCL; and
  the third polymer layer is positioned between the first polymer layer and the second polymer layer. In some embodiments, the third polymer layer comprises PLA at a concentration of from about 50 to about 70% (w/w) of the mixture and PCL at a concentration of from about 30 to about 50% (w/w) of the mixture. In certain embodiments, the third polymer layer comprises PLA at a concentration of about 60% (w/w) of the mixture and PCL at a concentration of about 40% (w/w) of the mixture. In some embodiments, one or more of the polymer layers further comprises a chain extender and/or a plasticizer.

In yet another embodiment, provided herein is a biodegradable sheet comprising at least three polymer layers, wherein
  each of a first polymer layer and second polymer layer comprises PBS;
  a third polymer layer comprises a mixture of PLA and PCL; and
  the third polymer layer is positioned between the first polymer layer and the second polymer layer. In some embodiments, the third polymer layer comprises PLA at a concentration of from about 50 to about 70% (w/w) of said mixture and PCL at a concentration of from about 30 to about 50% (w/w) of said mixture. In some embodiments, the third polymer layer comprises PLA at a concentration of about 60% (w/w) of said mixture and PCL at a concentration of about 40% (w/w) of said mixture.

In some embodiments, one or more of the polymer layers further comprises a chain extender and/or a plasticizer.

In additional embodiments, provided herein is a biodegradable sheet comprising at least three polymer layers, wherein
  each of a first polymer layer and a second polymer layer comprises a mixture of PLA and PCL;
  a third polymer layer comprises a PBAT; and
  the third polymer layer is positioned between the first polymer layer and the second polymer layer. In some embodiments, each of said first and second polymer layer comprises PLA at a concentration of from about 50 to about 70% (w/w) of the mixture and PCL at a concentration of from about 30 to about 50% (w/w) of the mixture. In certain embodiments, each of the first and second polymer layers comprises PLA at a concentration of about 60% (w/w) of the mixture and PCL at a concentration of about 40% (w/w) of the mixture. In some embodiments, one or more of the polymer layers further comprises a chain extender and/or a plasticizer.

Further provided herein is a biodegradable sheet comprising at least three polymer layers, wherein
  a first polymer layer comprises a mixture of PBSA and PLA;
  a second polymer layer comprises PHA;
  a third polymer layer comprises PBAT; and
  the second polymer layer is positioned between the first polymer layer and the third polymer layer. In some embodiments, each of the first polymer layer comprises PLA at a concentration of from about 15 to about 35% (w/w) of the mixture and PBSA at a concentration of from about 65 to about 85% (w/w) of said mixture. In certain embodiments, the first polymer layers comprise PLA at a concentration of about 25% (w/w) of the mixture and PBSA at a concentration of about 75% (w/w) of the mixture.

In some embodiments, one or more of the polymer layers further comprises a chain extender and/or a plasticizer.

In an additional embodiment, provided herein is a biodegradable sheet comprising at least three polymer layers, wherein
  a first polymer layer comprises a PLA;
  a second polymer layer comprises PBS;
  a third polymer layer comprises PBS.

Further provided herein is a biodegradable sheet comprising at least three coated polymer layers, wherein
  a first polymer layer comprises metalized PLA;
  a second polymer layer comprises metalized cellulose;
  a third polymer layer comprises PLA coated with siloxane; and
  the second polymer layer is positioned between the first polymer layer and the third polymer layer. In some embodiments, the first and second polymer layers are metalized using aluminum. In some embodiments, the metalized cellulose is a commercial product. In some embodiments, one or more of the polymer layers further comprises a chain extender and/or a plasticizer.

Provided herein is a biodegradable sheet comprising at least two polymer layers, wherein
  each of a first polymer layer and a second polymer layer comprise a mixture of PLA, PBS and PBAT.

In some embodiments, the polymer layers comprise PLA at a concentration of from about 25 to about 40% (w/w) of the mixture, PBS at a concentration of from about 25 to about 40% (w/w) of said mixture and PBAT at a concentration of 25 to about 40% (w/w). In certain embodiments, the PLA, PBS and PBAT are present in equal concentrations of about 33% (w/w) of the mixture.

For any of the biodegradable sheets disclosed herein at least one of the polymer layers optionally comprises a plasticizer. When present in a polymer layer, the plasticizer may be present at a concentration of from about 0.05 to about 5% (w/w) of the polymer layer. In some embodiments, the plasticizer comprises of PCL.

Coated Sheets

Further disclosed herein are single layered or multilayered biodegradable sheet with at least one layer that is coated with one or more of a metal coating, a shellac coating, a cellulose-based coating, polyvinylidene chloride (PVDC) coating and a plasma deposited siloxane based coating. Such sheets may exhibit advantageous impermeability expressed as reduced water vapor transmission rate (WVTR) and/or oxygen transmission rate (OTR), with improved sealing properties, and direct contact with liquids while maintaining the mechanistic features of flexible sheets as well as the biodegradability and compostability and/or bio-based properties.

In some embodiments of any of the biodegradable sheets disclosed herein, at least one polymer layer further comprises a coating layer on one or both surfaces. In a non-limiting example, for a three-layered sheet, the first polymer layer is coated on one or both sides. In some embodiments, the second polymer layer is coated on one or both sides. In some embodiments, the third polymer layer is coated on one or both sides. In some embodiments, each of the first and third polymer layers is independently coated on one or both sides. In some embodiments, each of the first and second polymer layers is independently coated on one or both sides. In some embodiments, each of the second and third polymer layers is independently coated on one or both sides.

In some embodiments, the coating is selected from the group consisting of a metal, shellac, a cellulose-based coating, a polyvinylidene chloride (PVDC) coating and a plasma deposited siloxane based coating.

In some embodiments, the coating comprises a biodegradable metal coating layer, for example, an aluminum coating, such as an aluminum dioxide layer. The metal layer may be applied to the polymer layer using direct metallization and such layer may optionally serve as a laminated layer.

In some embodiments, the coating comprises a first coating layer selected from the group consisting of shellac, a cellulose-based coating and a plasma deposited siloxane based coating and further comprises a biodegradable metal coating layer on the first coating layer.

In some embodiments, the coating comprises a biodegradable, metal coating layer, further coated with an additional layer selected from the group consisting of shellac, a cellulose-based coating, a polyvinylidene chloride (PVDC) coating and a plasma deposited siloxane based coating.

In some embodiments, the biodegradable sheets are provided with a coating in order to improve the impermeability of the sheets to, for example, oxygen and water vapor, enhance the sealing properties (e.g. increase sealing temperature window and/or sealing strength), provide a direct contact layer with liquids, improving coating adhesion or coating properties, while retaining the desirable features of being flexible, biodegradable, bio-based and/or compostable for packaging.

The present invention further provides a multilayered laminated structure comprising the biodegradable sheet according to any of the embodiments disclosed herein, and at least one additional layer attached to the biodegradable sheet by lamination.

In another aspect, provided herein is a method of preparing a biodegradable sheet comprising two or more layers, each layer independently comprising a biodegradable polymer or polymer mixture; and wherein at least one layer of the sheet optionally comprises a coating selected from the group consisting of a shellac coating, a cellulose-based coating, a polyvinylidene chloride (PVDC) coating and siloxane based coating, comprising the steps of
 i. Melt-extruding the polymer or polymer mixture;
 ii. Extruding the melt extrusion of step (i) to form a sheet;
 iii. Optionally metalizing one or more layers of the sheet;
 iv. Optionally coating one or both sides of the sheet resulting from step (ii) or step (iii) with the coating; and
 v. Optionally laminating the biodegradable sheet to a second biodegradable sheet;
thereby preparing the biodegradable sheet.

Steps (iii) and (iv) may be carried out in reverse order. For example, in some such embodiments, step (iii) is carried out prior to step (iv). In some embodiments, step (iv) is carried out prior to step (iii).

In various embodiments, the biodegradable sheets disclosed herein are sheets comprising one or more of the following polymers poly(epsilon-caprolactone) (PCL), polydioxanone (PDO), polyglycolic acid (PGA), polybutylene succinate (PBS), polybutylene succinate adipate (PBSA), polybutylene adipate terphtalate (PBAT), poly(lactic acid) (PLA), polyvinyl alcohol (PVOH), a polyhydroxyalkanoate (PHA) such as polyhydroxybutyrate (PHB), polyhydroxyvalerate (PHV), or polyhydroxybutyrate-hydroxyvalerate copolymer (PHBV); or any mixture thereof and at least one layer further comprises a shellac and/or nitrocellulose coating, or nanocrystalline cellulose coating or PVDC coating or a plasma deposited siloxane coating.

In other embodiments, the biodegradable sheet has at least one layer that is a contact layer for direct contact with a material and optionally one or more additional layers, wherein the contact layer comprises a first hydrophobic polymer selected from the group consisting of poly(epsilon-caprolactone) (PCL), a polyhydroxyalkanoate (PHA) and a mixture of PCL and PHA, and a second hydrophobic polymer selected from the group consisting of polybutylene succinate (PBS), polybutylene succinate adipate (PBSA), poly lactic acid (PLA), polybutylene adipate terphtalate (PBAT), polydioxanone (PDO), polyglycolic acid (PGA) and any combination or mixture thereof. In some embodiments, at least one layer of the sheet comprises a metal coating, shellac and/or nitrocellulose coating, or nanocrystalline cellulose coating, or PVDC coating or a plasma deposited siloxane coating.

The first hydrophobic polymers may be "super hydrophobic" polymers, referring to the tendency of non-polar composition to exclude water from its surface. The hydrophobic interaction is mostly an entropic effect originating from the disruption of highly dynamic hydrogen bonds between molecules of liquid water by the nonpolar surface (The Real Reason Why Oil and Water Don't Mix Todd P. Silverstein, J. Chem. Educ. 1998, 75 (1), p 116). A hydrocarbon chain or a similar nonpolar region or a large molecule is incapable of forming hydrogen bonds with water. Hydrophobicity can be calculated by the ratio of non-polar groups such as pure hydrocarbon molecule to polar groups such as hydroxyl, carbonyl, or ester groups. Super hydrophobic polymers shows high non-polar to polar ratio (higher than about 60%; see Table with PCL and PHA examples), and low hydrophobic polymers shows low non-polar to polar ratio (lower than about 60%). In some embodiments, the first hydrophobic polymer is PCL, a PHA or a mixture of PCL and a PHA. In some embodiments the first hydrophobic polymer is PCL. In some embodiments, the first hydrophobic polymer is PHA. The PHA may be selected from any PHA known in the art, including but not limited to polyhydroxybutyrate (PHB), polyhydroxyvalerate (PHV), polyhydroxybutyrate-hydroxyvalerate copolymers (PHBV); and any derivative or mixture thereof. In some embodiments, the first hydrophobic polymer is a mixture of PCL and a PHA, for example a mixture of PCL and one or more of polyhydroxybutyrate (PHB), polyhydroxyvalerate (PHV), polyhydroxybutyrate-hydroxyvalerate copolymers (PHBV); or any derivative thereof.

In some embodiments, the amount of the first hydrophobic polymer is present in an amount of about 5% w/w to about 45% w/w of the contact layer, or about 20% w/w to about 45% w/w or about 25% to about 40%. The first hydrophobic polymer, PCL, PHA or a mixture thereof is present in an amount of about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, or about 45% w/w.

In some embodiments, the second hydrophobic polymer is selected from the group consisting of PBS, PBSA, PLA, PBAT and any mixture thereof. In some embodiments, the second hydrophobic polymer is PLA. In some embodiments, the second hydrophobic polymer is PBAT. In some embodiments, the second hydrophobic polymer is PBS. In some embodiments, the second hydrophobic polymer is PBSA.

In some embodiments, the second hydrophobic polymer comprises a mixture selected from the group consisting of a mixture of PBS and PBSA, a mixture of PBS and PLA, a mixture of PBSA and PLA and a mixture of PBAT and PLA. In some embodiments, the second hydrophobic polymer is a mixture of PBS and PBSA. In some embodiments, the second hydrophobic polymer is a mixture of a PBS and PLA. In some embodiments, the second hydrophobic polymer is a mixture of PBSA and PLA. In some embodiments, the second hydrophobic polymer is a mixture of PBAT and PLA. The second hydrophobic polymer or hydrophobic polymer mixture is present in an amount of about 55% w/w to about 95% w/w, about 60% to about 90%, about 60% to about 80%, or about 60% to about 75%.

In some embodiments, the sheet is a single layered sheet. In some embodiments, the sheet is a multi-layered sheet. A multi-layered sheet consists of 2, 3, 4, or 5 or more layers. A first layer is also referred to as "Layer 1", a second layer is also referred to as Layer 2; a third layer is also referred to as "Layer 3" and so on.

In some embodiments, the sheet is a two-layered sheet. In some embodiments, the two-layered sheet comprises a first layer comprising about 70%-80% w/w PBS or PBSA and about 20%-30% PLA and a second layer comprising about 15%-35% w/w PLA or PBSA, about 50%-60% w/w PBS or PBSA or PBAT and about 5%-30% w/w PCL. In other embodiments, the two-layered sheet comprises a first layer comprising about 75% w/w PBS or PBSA and about 25% PLA and a second layer comprising about 19%-20% w/w PLA, about 55%-56% w/w PBS and about 25% w/w PCL. In yet other embodiments, the two-layered sheet comprises a first layer comprising about 75% w/w PBS or PBSA and about 25% PLA and a second layer comprising about 19%-20% w/w PLA, about 55%-56% w/w PBSA and about 25% w/w PCL. The second layer is the contact layer.

In some embodiments, the biodegradable sheet is a three-layered sheet.

In some embodiments, the three layered sheet comprises a first layer comprising about 70%-80% w/w PBS or PBSA and about 20%-30% PLA; a second layer comprising about 70%-80% w/w PBS or PBSA and about 20%-30% PLA; and a third layer comprising about 5%-45% w/w PCL or PHA and about 55% to about 95% w/w PLA, PBS, PBSA, PBAT or a mixture thereof, wherein the second layer is an internal layer and the third layer is the contact layer. In some embodiments, the three layered sheet comprises a first layer comprising about 100% w/w PBS or PBSA.

In some embodiments, the three layered sheet comprises a second layer comprising about 100% PBS or PBSA.

In some embodiments, the three layered sheet comprises a third layer comprising about 15%-25% w/w PBS or PLA, about 50%-60% w/w PBAT or PBSA and about 20%-30% PCL.

In other embodiments, the three layered sheet comprises a third layer comprising about 15%-25% w/w PBSA, about 50%-60% w/w PBS and about 20%-30% PCL.

In order to define the physical properties of the biodegradable sheets disclosed herein, several measurements were used. Stress at maximum load, Young's Modulus and the strain at break were measured using the ASTM D882-10 Standard Test Method for Tensile Properties of Thin Plastic Sheeting. The light transmittance and the haze were measured using the ASTM D1003-07e1 Standard Test Method for Haze and Luminous Transmittance of Transparent Plastics. The oxygen permeability of the biodegradable sheets was measured using the ASTM D3985-05(2010)e1 Standard Test Method for Oxygen Gas Transmission Rate Through Plastic Film and Sheeting Using a Coulometric Sensor. The water vapor permeability of the biodegradable sheets of the invention was measured using the ASTM E398-03(2009)e1 Standard Test Method for Water Vapor Transmission Rate of Sheet Materials Using Dynamic Relative Humidity Measurement.

In an embodiment of the invention, this invention provides a biodegradable sheet having a stress at maximum load of at least 15 Mpa. According to other embodiments, this invention provides a biodegradable sheet having a stress at maximum load of at least 30 Mpa. According to some embodiments of the invention, the stress at maximum load is in the range of 15-50 Mpa. According to some embodiments of the invention, the stress at maximum load is in the range of 15-20 Mpa. According to some embodiments of the invention, the stress at maximum load is in the range of 20-25 Mpa. According to some embodiments of the invention, the stress at maximum load is in the range of 25-30 Mpa. According to some embodiments of the invention, the stress at maximum load is in the range of 30-35 Mpa. According to some embodiments of the invention, the stress at maximum load is in the range of 35-40 Mpa. According to some embodiments of the invention, the stress at maximum load is in the range of 40-45 Mpa. According to some embodiments of the invention, the stress at maximum load is in the range of 45-50 Mpa. According to further embodiments of the invention, the stress at maximum load is in the range of 24-26 Mpa. According to further embodiments of the invention, the stress at maximum load is in the range of 46-48 Mpa. According to further embodiments of the invention, the stress at maximum load is in the range of 32-34 Mpa. According to some embodiments of the invention, the stress at maximum load is in the range of 19-21 Mpa. According to some embodiments of the invention, the stress at maximum load is in the range of 29-31 Mpa.

Shellac

Shellac can be machine made or handmade and it takes about 100,000 lac insects to make 1 lb. of shellac resin. Heating is the only process for handmade shellac but the machine made shellac can be processed by heating, solvent extraction and decolorization. Alcohol solvents are used for the solvent extraction and for the Dewaxing/Decoloring processes, the solution is forced through activated carbon filters to remove the darker coloring constituents from the shellac. By varying the amount of carbon, contact time and quality of the shellac, several grades of shellac ranging in color from light to amber can be obtained.

Many modifications and variations are possible in light of the above teachings. It is, therefore, to be understood that within the scope of the appended claims, the invention can be practiced otherwise than as specifically described.

The present disclosure is illustrated in detail below with reference to examples, but is not to be construed as being limited thereto.

Throughout this application, various publications, including U.S. patents, are referenced by author and year and patents by number. The disclosures of these publications and patents and patent applications in their entireties are hereby incorporated by reference into this application in order to more fully describe the state of the art to which this invention pertains.

Citation of any document herein is not intended as an admission that such document is pertinent prior art, or considered material to the patentability of any claim of the present disclosure. Any statement as to content or a date of any document is based on the information available to applicant at the time of filing and does not constitute an admission as to the correctness of such a statement.

EXAMPLES

In the experimental section below, all percentages are weight percentages.
Materials and Methods All the embodiments of polymer sheets according to the teachings herein were prepared using commercially-available raw materials and devices, using one or more standard methods including: polymer resin drying, resin mixing, cast film extrusion, cast film co-extrusion, metallization and thermal lamination.
Materials The following polymer resins and raw materials were acquired from commercial sources:
PCL poly(epsilon-caprolactone)
PLA poly(lactic acid)
PBS poly(butylene succinate)
PBSA poly(butylene succinate adipate)
PBAT poly(butylene adipate terphtalate)
PHA poly(hydroxyalkanoate)
PVOH poly(vinyl alcohol)
Tie later: poly(vinyl acetate)
Adhesive: water-based polyester-polyurethane adhesive
Cellulose
Resin Drying Before use, resins were dried overnight in an air flow Shini SCD-160U-120H dryer desiccator heated to 50° C.
Resin Mixtures As seen from Tables 1 and 2, some embodiments of the polymer sheets according to the teachings herein included layers comprising a polymer mixture. Such layers were prepared by extrusion/coextrusion of a polymer mixture resin.

To prepare the required polymer mixture resins, the appropriate amounts of the dried constituent resins were dry-blended, introduced into the feed of a twin screw compounder and then melt extruded to form a polymer mixture resin. During melt extrusion in the compounder, the temperature zone settings were 170-175-180-185-190° C. Die at 190° C., a screw speed of 350 rpm and pressure 15-25 bar.

The compounded polymer resin was ground into 1-5 mm diameter pellets using strand pelletizer.

Cast Film Coextrusion of Films and Sheets

Some embodiments of sheets according to the teachings herein were prepared by coextrusion of two or more layers to prepare a desired sheet by multilayer cast film co extrusion.

Some embodiments of sheets according to the teachings herein were prepared by lamination of single and multilayer cast film extruded films.

Films and sheets were prepared using a cast film coextruder Dr. Collin (Collin Lab and Pilot Solutions) using standard settings, typically the mixture was feed into the extruder with the temperature zone settings 170-180-200° C.; Adaptor at 200° C.; feedblock at 200° C.; Die at 200° C. The screw speed was set to provide an extruded layer having the desired thickness in the usual way. For multilayer sheets a die having three ports, each fed by a dedicated extruder was used.
Metallization Metallization was performed using a physical vapor deposition process with aluminum vapor under vacuum.
Heat Set Lamination Heat set lamination to prepare a sheet according to the teachings herein was performed by feeding the constituent films from spools into a lamination machine. In some instances, two films were directly laminated. In some instances, two films were laminated with the help of an applied water-based adhesive at 2 g/m$^2$ as a 2 micrometer thick tie layer between the two films
Coating A thin film coating of shellac or cellulose was applied on certain sheets as defined below at a 3 g/m$^2$ concentration. For metallized films, the coating was applied on the metallized side. The film coating was dried overnight at ambient temperature.

Alternatively, the sheets were coated with a siloxane mixture (referred to herein as "Siox") using plasma surface treatment. Specifically, a sheet to be treated was placed in a vacuum chamber. A radio frequency (RF) generator was used to generate plasma to treat the surface of the sheet in two steps: a first cleaning step including a short plasma treatment cycle (cleaning step), and a second siloxane-mixture deposition step. This step was performed with an RF generator that creates a plasma flow of energetic radicals which bombard the surface of an object (e.g. sheet).

The sheet is placed at a low vacuum environment in a vacuum chamber for the entire process.

Alternatively, the sheets were coated with a nano-crystalline cellulose particles after plasma surface treatment. Specifically, a sheet to be treated was placed in a vacuum chamber. A radio frequency (RF) generator was used to generate plasma to treat the surface of the sheet in two steps: a first cleaning step including a short plasma treatment cycle (cleaning step), and a second nano-crystalline cellulose deposition step. This step was performed an automatic roller coater to spread the coating on the surface of an object (e.g. sheet).

The sheet is placed at a low vacuum environment in a vacuum chamber for the entire process.

Example 1: Specific Embodiments of Sheets and Laminates According to the Present Teachings Specific embodiments of sheets and laminates according to the teachings are shown in Table 1 and Table 2, respectively, and described below:

TABLE 1

Films

| Sheet # | Layer | Thickness (μ) | Layer | Thickness (μ) | Layer | Thickness (μ) |
|---|---|---|---|---|---|---|
| 1 | PLA (60%):PCL (40%) | 10-30 | PBS | 7-20 | | |
| 2 | PBSA (75%):PLA (25%) | 10-15 | PBAT | 15-20 | PBSA (75%):PLA (25%) | 5-10 |
| 3 | PBSA (75%):PLA (25%) | 5-15 | PBAT | 20-40 | PBSA | 5-15 |
| 4 | PBS | 10-25 | PBAT | 15-35 | PBS | 5-20 |
| 5 | PBSA (75%):PLA (25%) | 10-25 | PHA | 15-40 | PBSA | 15-25 |
| 6 | PBSA (75%):PLA (25%) | 10-25 | PHA | 15-40 | PBAT | 10-30 |
| 7 | PBSA (75%):PLA (25%) | 10-25 | PBSA (75%):PLA (25%) | 15-40 | PBS | 10-25 |
| 8 | PBSA (75%):PLA (25%) | 10-25 | PBSA (75%):PLA (25%) | 10-30 | PBS (56):PLA (19):PCL (25%) | 10-40 |
| 9 | PLA (60%):PCL (40%) | 5-15 | PBAT | 20-40 | PLA (60%):PCL (40%) | 5-15 |
| 10 | PLA | 5-10 | PBS | 7-20 | PBS | 5-10 |
| 11 | PLA-metallized | 15-50 | Cellulose-metallized | 15-50 | PLA-Siox | 15-35 |
| 12 | PBS | 5-20 | PLA (60%):PCL (40%) | 10-30 | PBSA | 10-20 |
| 13 | PBS | 5-20 | PLA (60%):PCL (40%) | 10-30 | PBS | 5-10 |
| 14 | PBSA (75%):PLA (25%) | 15-60 | PBSA (75%):PLA (25%) | 15-60 | | |
| 15 | PBSA (85%):PLA (15%) | 15-60 | PBSA (85%):PLA (15%) | 15-60 | | |
| 16 | PBS (80%):PLA (20%) | 15-60 | PBS (80%):PLA (20%) | 15-60 | | |
| 17 | PLA (33%):PBS (33%):PBAT (33%) | 15-60 | PLA (33%):PBS (33%):PBAT (33%) | 15-60 | | |

TABLE 2

Laminates

| Laminate # | Film | Thickness (μ) | Layer | Thickness (μ) | Layer | Thickness (μ) |
|---|---|---|---|---|---|---|
| 1 | Sheet #10-shellac | 20-30 | Sheet #1-metallized | 20-30 | Sheet #3 | 20-40 |
| 2 | Sheet #1-Shellac | 20-30 | Sheet #2 | 30-60 | | |
| 3 | Sheet #1-metallized-Shellac | 20-30 | Sheet #2 | 30-60 | | |
| 4 | Sheet #1-metallized-Shellac | 20-30 | Sheet #3 | 20-40 | | |
| 5 | Sheet #10-shellac | 20-30 | Sheet #11 | 20-30 | Sheet #3 | 20-40 |

Table 1, sheet #1 prepared by cast film coextrusion of
60% PLA: 40% PCL (extruder I),
PBS (extruder II), Table 1, sheet #2 prepared by cast film coextrusion of
25% PLA: 75% PBSA (extruder I),
PBAT (extruder II),
25% PLA: 75% PBSA (extruder III), Table 1, sheet #3 prepared by cast film coextrusion of
75% PBSA: 25% PLA (extruder I),
PBAT (extruder II),
PBSA (extruder III), Table 1, sheet #4 prepared by cast film coextrusion of
PBS (extruder I),
PBAT (extruder II),
PBS (extruder III), Table 1, sheet #5 prepared by cast film coextrusion of
75% PBSA: 25% PLA (extruder I),
PHA (extruder II),
PBSA (extruder III), Table 1, sheet #6 prepared by cast film coextrusion of
75% PBSA: 25% PLA (extruder I),
PHA (extruder II),
PBAT (extruder III), Table 1, sheet #7 prepared by cast film coextrusion of
75% PBSA: 25% PLA (extruder I),
75% PBSA: 25% PLA (extruder II),
PBS (extruder III), Table 1, sheet #8 prepared by cast film coextrusion of
75% PBSA: 25% PLA (extruder I),
75% PBSA: 25% PLA (extruder II),
PBS (56%):PLA (19%):PCL (25%) (extruder III), Table 1, sheet #9 made by cast film coextrusion of
PLA (60%):PCL (40%) (extruder I),
PBAT (extruder II),
PLA (60%):PCL (40%) (extruder III), Table 1, sheet #10 prepared by cast film coextrusion of
PLA (extruder I),
PBS (extruder II),
PBS (extruder III), Table 1, sheet #11 prepared by cast film coextrusion of
Commercially available metallized PLA (extruder I),
Commercially available metallized cellulose (extruder II), PLA-Siox (Commercially available PLA that underwent vapor deposition of silicon oxide (SiOx) (extruder III),
Table 1, sheet #12 prepared by cast film coextrusion of
  PBS (extruder I),
  PLA (60%):PCL (40%) (extruder II),
  PBSA (extruder III),
Table 1, sheet #13 prepared by cast film coextrusion of
  PBS (extruder I),
  PLA (60%):PCL (40%) (extruder II),
  PBS (extruder III),
For sheets #1-13:
  (i) Optionally, co-extruded films may employ 55% to 65% PLA: 35% to 45% PCL or PBS (56%):PLA (19%):PCL (25%) instead of PLA (60%):PCL (40%) in extruder I, extruder II and/or extruder III.
  (ii) Optionally, co-extruded films may employ PBSA (85%):PLA (15%) instead of PBSA (75%):PLA (25%) in extruder I, extruder II and/or extruder III.
  (iii) Optionally, metallization or a shellac-based, a cellulose-based (including plasma-treated and nano-crystalline cellulose), a PVDC, and/or a plasma deposited siloxane-based coating layer may be provided on the layer produced by extruder I, on the side facing the layer produced by extruder II.
  (iv) Optionally, a platicizer may be added to extruder I, extruder II and/or to extruder III in a weight to weight ratio of 0.5 to 5%. This platicizer may be a commercially available platicizer, for example, PCL per se.
Table 1, sheet #14 prepared by cast film coextrusion of
  PBSA (75%):PLA (25%) (extruder I),
  PBSA (75%):PLA (25%) (extruder II).
Table 1, sheet #15 prepared by cast film coextrusion of
  PBSA (85%):PLA (15%) (extruder I),
  PBSA (85%):PLA (15%) (extruder II).
Table 1, sheet #16 prepared by cast film coextrusion of
  PBS (80%):PLA (20%) (extruder I),
  PBS (80%):PLA (20%) (extruder II).
Table 1, sheet #17 prepared by cast film coextrusion of
  PLA (33%):PBS (33%):PBAT (33%) (extruder I),
  PLA (33%):PBS (33%):PBAT (33%) (extruder II).
Table 2, laminate #1 prepared using the cast coextruded films of
  Sheet #10, coated with shellac,
  Sheet #1, metallized,
  Sheet #3.
Table 2, laminate #2 prepared using the cast coextruded films of
  Sheet #1, coated with shellac,
  Sheet #2.
Table 2, laminate #3 prepared using the cast coextruded films of
  Sheet #1, metallized and then coated with shellac
  Sheet #2.
Table 2, laminate #4 prepared using the cast coextruded films of
  Sheet #1, metallized and then coated with shellac,
  Sheet #3.
Table 2, laminate #5 prepared using the cast coextruded films of
  Sheet #10, coated with shellac,
  Sheet #11,
  Sheet #3.
Optionally, laminates may be formed using any of Sheets #1-17 with or without metallized coating and/or a shellac-based, a cellulose-based (including plasma-treated and nano-crystalline cellulose), a PVDC, and/or a plasma deposited siloxane-based coating.

For sheets which are metalized and shellac coated, the shellac coating is applied following metallization.

For sheets with shellac coating, the shellac is applied between coextruded films of the laminate.

Example 2: Physical Properties of an Exemplary Sheet as Disclosed Herein

In order to define the physical properties of an exemplary biodegradable sheet as disclosed herein (sheet #3) of Table 1, several measurements were used.

Young's Modulus and UTS were measured using the ASTM D882-10 Standard Test Method for Tensile Properties of Thin Plastic Sheeting.

Haze was measured using the ASTM D1003-07e1 Standard Test Method for Haze and Luminous Transmittance of Transparent Plastics.

Impact was measured using the ASTM D1709 Standard Test Method for Impact Resistance of Plastic Film by the Free-Falling Dart.

Figure 1B:
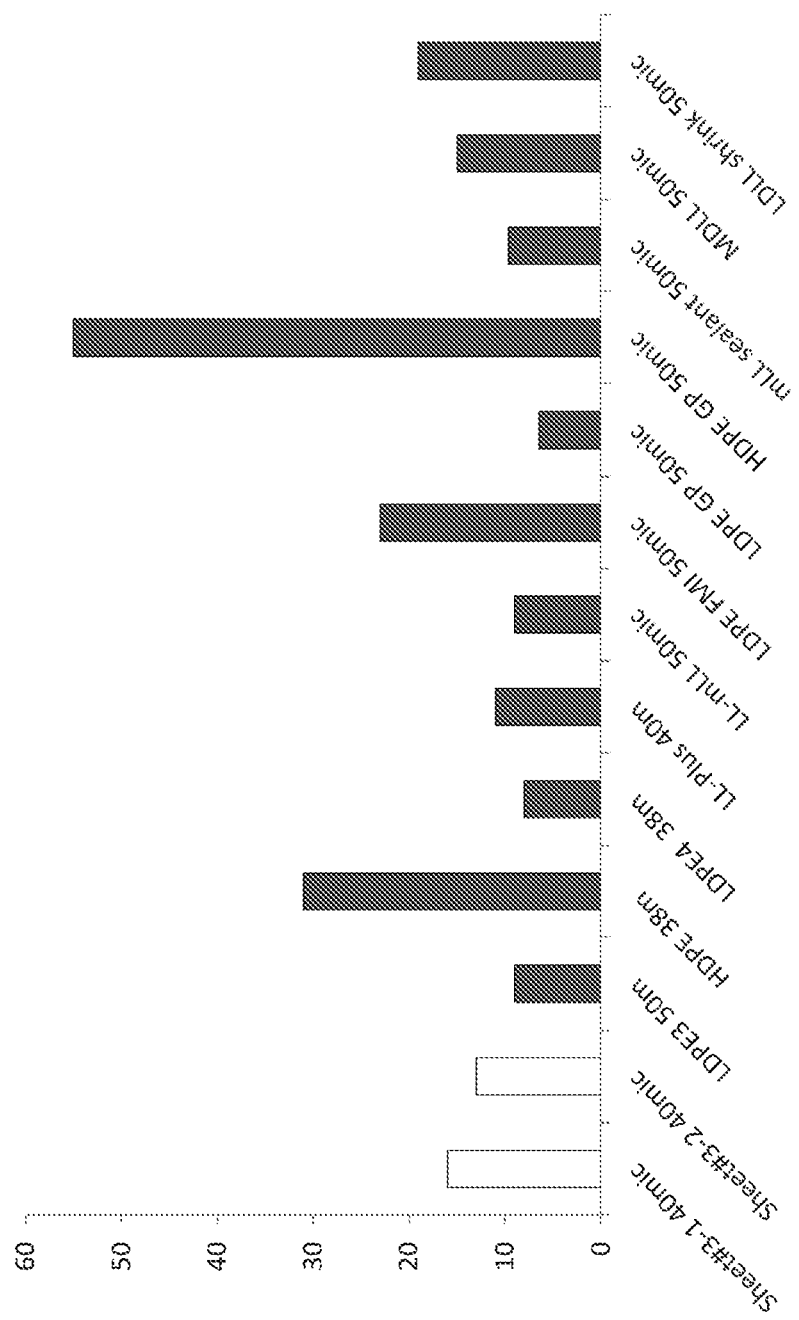
Figure 1D:
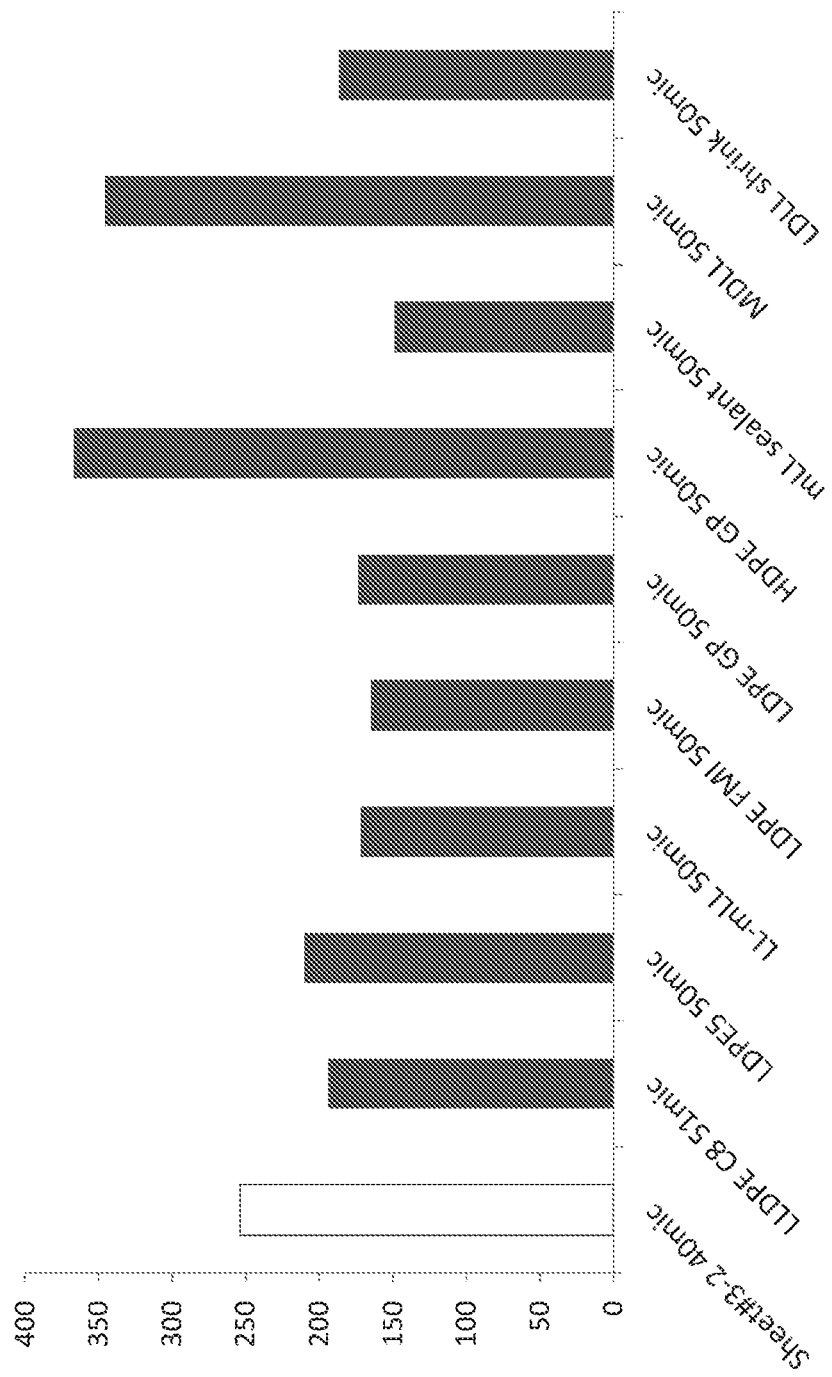

Physical properties of the exemplary sheet were compared to those of a wide range of non-biodegradable, commercial polyethylene films which are commonly used in the packaging industry. Results are shown in FIG. 1.

As seen in FIGS. 1A-1D, the exemplary sheet according to the teachings disclosed herein was shown to have values of impact, haze, modulus and ultimate tensile strength in machine direction which compare favorably to those of the non-degradable commercial polyethylene films.

Example 3: Methods to Generate Biodegradable Laminates with Coated Biodegradable Sheets All of the multilayer sheets disclosed herein were about 15-120 microns thick. Aluminum metallization of some of the sheets disclosed herein below may be performed using methods known in the art. In some embodiments the metallization was carried out using aluminum under vacuum and low temperature metallization. As disclosed herein, Layer 1 is the layer in contact with the material, for example liquid, semi-solid or solid material.

Sheet #18: A three-layered biodegradable sheet consisting of about 16.7% w/w PLA, 83.3% w/w PBSA was prepared as follows:
A. Melt Extrusion Compounding Stage:
1. 50 gr PLA and 150 gr PBSA were dried overnight at a temperature of 50° C. under vacuum;
2. the dried polymers were dry blended and placed in a two screw PRISM compounder;
3. the polymers were melt extruded in the PRISM compounder set to the following profile:
i) temperature profile: 170-175-180-185-190° C. (the Die is set to 190° C.);
ii) screw speed: 250 rpm; and
iii) pressure: 15-25 bar;
to generate "compound A"
B) Cast Co-Extrusion Stage:
1. The melt extruded materials comprised of 400 gr compound A and 200 gr PBSA were dried overnight at a temperature of 50° C. under vacuum on a Shini SCD-160U-120H dryer;
2. The materials were placed into a Collin co-extrusion lines, and set to the following profile:
Extruder A) 190-200-220° C.-200° C.—Adaptor; 220° C.—feedblock; Die—210° C.; screw speed: 80 rpm
Extruder B) 190-220-230° C.-200° C.—Adaptor; 230° C.—feedblock; Die—230° C.; screw speed: 45 rpm Extruder C) 190-200-220° C.-200° C.—Adaptor; 220° C.—feedblock; Die—210° C.; screw speed: 80 rpm Head pressure 50 bar.

A 15 micron thick 3-layer sheet was generated having the following layers:
Layer 1: consisting of about 75% w/w PBSA and about 25% w/w PLA;
Layer 2: consisting of about 100% w/w PBSA; and
Layer 3: consisting of about 75% w/w PBSA and about 25% w/w PLA.

C) Coating and Lamination Stage:

A thin film coating of shellac or nitrocellulose was applied on the 15 micron thick sheet of (B) at a 3 g/m² concentration. The film was dried overnight at ambient temperature, and the sheet was used per se or laminated with biodegradable water-based adhesive (for example, Epotal® 2 g/m2) to any of the listed below sheets i-xx. Typically, coating took place on the side with the adhesive. In metallized films, the coating was applied on the metallized side. For non-metallized films coating was typically applied on the Compound A or PBSA layer. A laminated sheet is typically about 30 microns to about 200 microns thick.

i) A three layered biodegradable sheet (15 microns thick) of B), above:
   Layer 1: consisting of about 75% w/w PBSA and about 25% w/w PLA;
   Layer 2: consisting of about 100% w/w PBSA; and
   Layer 3: consisting of about 75% w/w PBSA and about 25% w/w PLA;
ii) A three layered biodegradable sheet (36 microns thick) was prepared according to the procedure described above for Sheet #18, wherein the co-extrusion step included 200 g of compound A (Sheet #18), 134 g of commercially available PBAT blend and 200 g of PBSA, and having the following layers;
   Layer 1: consisting of about 75% w/w PBSA and about 25% w/w PLA;
   Layer 2: consisting of about 100% w/w PBAT; and
   Layer 3: consisting of about 100% w/w PBSA;
iii) A three layered biodegradable sheet (36 microns thick) in 2, above, that was coated with commercially available nitrocellulose (Cellax®);
iv) A three layered biodegradable sheet (36 microns thick) in 2, above, that was coated with commercially available nitrocellulose (Cellax®®) and then was coated with a thin film coating of shellac at 3 g/m² concentration on the Cellax® side;
v) A commercially available aluminum metalized PLA (about 20 microns thick) (for example, vacuum and low temperature metallization);
vi) A commercially available sheet comprising of 10% w/w PLA and 90% w/w PBAT;
vii) A three layered aluminum metalized biodegradable sheet (15 microns thick) of B)
viii) A single layer aluminum metalized biodegradable sheet (about 30-120 microns thick);
ix) A single layer aluminum metalized biodegradable sheet of PBS (30-20 microns thick) coated with commercially available nitrocellulose (Cellax®) on the metalized side;
x) A single layer aluminum metalized biodegradable sheet of PBS (30-20 microns thick) coated with a thin film coating of shellac at 3 g/m² concentration on the metalized side;
xi) A single layer aluminum metalized biodegradable sheet of PBS (30-20 microns thick) coated with a thin film coating of shellac at 3 g/m² concentration on both sides;
xii) A single layer biodegradable sheet of PBS (30-20 microns thick) that was coated with commercially available nitrocellulose (Cellax®);
xiii) A three layered biodegradable sheet (100-15 microns thick) was prepared according to the procedure described above for Sheet #18, wherein at the co-extrusion step included 240-120 g of PBS, 120-360 g of commercially available PBAT blend and 240-240 g of PBS, which was metalized with aluminum, having the following layers;
   Layer 1: consisting of about 100% w/w PBS;
   Layer 2: consisting of about 100% w/w PBAT; and
   Layer 3: consisting of about 100% w/w PBS;
xiv) A three layered aluminum metalized biodegradable sheet (15-100 microns thick) of xiii, above coated with commercially available nitrocellulose (Cellax®) on the metalized side;
xv) A three layered aluminum metalized biodegradable sheet (15-100 microns thick) of xiii, above coated with thin film coating of shellac at 3 g/m² concentration on the metalized side;
xvi) A three layered aluminum metalized biodegradable sheet (15-100 microns thick) of xiii, above coated with thin film coating of shellac at 3 g/m² concentration on both sides;
xvii) A three layered biodegradable sheet (15-100 microns thick) of 13, above coated with commercially available nitrocellulose (Cellax®);
xviii) A three layered biodegradable sheet (15-100 microns thick) prepared according to the procedure described above for Sheet #18, wherein at the co-extrusion step included 120-240 g of compound A, 120-360 g of PHA and 120-240 g of PBSA, and having the following layers;
   Layer 1: consisting of about 75% w/w PBSA and about 25% w/w PLA;
   Layer 2: consisting of about 100% w/w PHA; and
   Layer 3: consisting of about 100% w/w PBSA;
xix) A three layered biodegradable sheet (15-100 microns thick) prepared according to the procedure described above for Sheet #18, wherein the co-extrusion step included 120-240 g of compound A, 120-360 g of PHA and 120-240 g of PBAT blend, using similar steps as in Sheet #18, B;
   Layer 1: consisting of about 75% w/w PBSA and about 25% w/w PLA;
   Layer 2: consisting of about 100% w/w PHA; and
   Layer 3: consisting of about 100% w/w PBAT blend;
xx) A bi-layered biodegradable sheet (15-100 microns thick) prepared according to the procedure described above for Sheet #18, wherein at the co-extrusion step included 200 g of PBS and 200 g of PHA, and having the following layers;
   Layer 1: consisting of about 100% w/w PBS; and
   Layer 2: consisting of about 100% w/w PHA;

For all of the following sheets #18 to #35 a multilayer laminated sheet is obtained by laminating the sheet to any of the sheets i-xx, as disclosed above for Sheet #18.

Sheet #19: A three layered biodegradable sheet (about 30 microns thick) was prepared according to the procedure described above for Sheet #18, with the following modification: the cast co-extrusion stage included 200 g of compound A, 200 g of compound A and 200 g PBS. Next, the outer side of the sheet was metalized with aluminum under vacuum and low temperature. The coating and optional lamination steps were performed as described for Sheet #18, on the metalized side of the sheet.

Layer 1: consisting of about 75% w/w PBSA and about 25% w/w PLA;

Layer 2: consisting of about 75% w/w PBSA and about 25% w/w PLA; and

Layer 3: consisting of about 100% w/w PBS+metallization+shellac+optional lamination A multilayer laminated sheet is obtained by laminating Sheet #19 to any of the sheets i-xx, as disclosed above for sheet #18.

Sheet #20: A three layered biodegradable sheet (60 microns thick) was prepared according to the procedure described above for Sheet #18, wherein biodegradable water-based adhesive was applied on the inner side (Layer 1) of the 15 microns thick sheet in 1, B and commercially available metalized cellulose (20 microns thick) that was coated and then laminated using biodegradable water-based adhesive with commercially available PBAT/PLA film. The optional lamination stage were performed as described for Sheet #18, on the outer layer (Layer 3) of the sheet. Layer 1: consisting of about 75% w/w PBSA and about 25% w/w PLA+cellulose metalized+shellac+lamination to PBAT/PLA;

Layer 2: consisting of about 100% w/w PBSA; and

Layer 3: consisting of about 75% w/w PBSA and about 25% w/w PLA+lamination. Both inner and pouter layers are laminated.

A multilayer laminated sheet is obtained by laminating Sheet #3 to any of the sheets i-xx, as disclosed above for sheet #18.

Sheet #21: A three layered biodegradable sheet (about 60 microns thick) was prepared according to the procedure described above for Sheet #18, wherein a biodegradable water-based adhesive was applied on the inner side of the 15 microns thick sheet in 1 B and commercially available metalized cellulose (about 20 microns thick) and coated that was laminated using biodegradable water-based adhesive with PBSA. The optional lamination stage were performed as described for Sheet #18, on the outer side of the sheet the sheet having the following layers:

Layer 1: consisting of about 75% w/w PBSA and about 25% w/w PLA+cellulose metalized+shellac+lamination to PBSA;

Layer 2: consisting of about 100% w/w PBSA; and

Layer 3: consisting of about 75% w/w PBSA and about 25% w/w PLA+lamination A multilayer laminated sheet is obtained by laminating Sheet #21 to any of the sheets i-xx, as disclosed above for sheet #18.

Sheet #22: A single layer biodegradable sheet (60 microns thick) was prepared by co-extrusion of PBS and styrene-acrylic epoxy-based chain extender (0.1% wt), using similar steps as for Sheet #18. The shellac coating and optional lamination stage were performed as for Sheet #18, the sheet having the following layers:

Layer 1: consisting of about 100% w/w PBS and chain extender+shellac+optional lamination;

A multilayer laminated sheet is obtained by laminating Sheet #22 to any of the sheets i-xx, as disclosed above for sheet #18.

Sheet #23: A single layer biodegradable sheet (60 microns thick) was prepared according to the procedure described above for Sheet #22, wherein the co-extrusion step employed PBSA and 0.3% wt of the styrene-acrylic epoxy-based chain extender.

Layer 1: consisting of about 100% w/w PBSA and chain extender+shellac+optional lamination A multilayer laminated sheet is obtained by laminating Sheet #6 to any of the sheets i-xx, as disclosed above for sheet #18.

Sheet #24: A three layered biodegradable sheet (60 microns thick) was prepared according to the procedure described above for Sheet #18, wherein at the co-extrusion step 200 g of compound A, 200 g of PVOH and 200 g of compound A were co-extruded with 0.4% wt of the styrene-acrylic epoxy-based chain extender, using similar steps as in Sheet #18. The shellac coating and optional lamination stage were performed as for Sheet #18.

Layer 1: consisting of about 75% w/w PBSA and about 25% w/w and chain extender;

Layer 2: consisting of about 100% w/w PVOH and chain extender; and

Layer 3: consisting of about 75% w/w PBSA and about 25% w/w PLA and chain extender+shellac+optional lamination A multilayer laminated sheet is obtained by laminating Sheet #24 to any of the sheets i-xx, as disclosed above for sheet #18.

Sheet #25: A three layered biodegradable sheet (about 60 microns thick) was prepared according to the procedure described above for Sheet #18, with the following modification: the cast co-extrusion stage included 120-240 g of compound in Sheet #18, A, 120-360 g of compound in Sheet #18, A and 120-240 g PBSA. The coating and optional lamination stage were as in Sheet #18, on the outer side of the sheet.

Layer 1: consisting of about 75% w/w PBSA and about 25% w/w PLA;

Layer 2: consisting of about 75% w/w PBSA and about 25% w/w PLA; and

Layer 3: consisting of about 100% w/w PBSA+shellac+lamination

A multilayer laminated sheet is obtained by laminating Sheet #25 to any of the sheets i-xx, as disclosed above for sheet #18.

Sheet #26: A three layered biodegradable sheet (about 60 microns thick) was prepared according to the procedure described above for Sheet #25, with the coating and optional lamination performed as described for Sheet #18, on the inner side of the sheet.

Layer 1: consisting of about 75% w/w PBSA and about 25% w/w PLA+shellac+lamination;

Layer 2: consisting of about 75% w/w PBSA and about 25% w/w PLA; and

Layer 3: consisting of about 100% w/w PBSA;

A multilayer laminated sheet is obtained by laminating Sheet #26 to any of the sheets i-xx, as disclosed above for sheet #18.

Sheet #27: A three layered biodegradable sheet (about 60 microns thick) was prepared according to the procedure described above for Sheet #25. The outer side of the sheet (PBSA) was coated with copolymer of vinylidene chloride (PVDC) solution at 1% max of the film weight 2 g/m$^2$. The shellac coating and optional lamination on the inner side of the sheet were performed as described for Sheet #18.

Layer 1: consisting of about 75% w/w PBSA and about 25% w/w PLA+shellac+lamination;

Layer 2: consisting of about 75% w/w PBSA and about 25% w/w PLA; and

Layer 3: consisting of about 100% w/w PBSA+PVDC

A multilayer laminated sheet is obtained by laminating Sheet #27 to any of the sheets i-xx, as disclosed above for sheet #18.

Sheet #28: A three layered biodegradable sheet (about 36 microns thick) was prepared according to the procedure described above for Sheet #18, wherein at the co-extrusion step included 200 g of compound A, 134 g of commercially available PBAT blend and 200 g of PBSA. The shellac coating and optional lamination were performed as described for Sheet #18.

Layer 1: consisting of about 75% w/w PBSA and about 25% w/w PLA;
Layer 2: consisting of about 100% w/w PBAT blend; and
Layer 3: consisting of about 100% w/w PBSA+shellac+ lamination;

A multilayer laminated sheet is obtained by laminating Sheet #28 to any of the sheets i-xx, as disclosed above for sheet #18.

Sheet #29: A commercially available PLA (20 microns thick) that underwent vapor deposition of silicon oxide (referred to herein as Siox or SiOx) film, was coated with commercially available nitrocellulose (Cellax®) on the SiOx side, using a method similar to the aforementioned shellac coating, and optional lamination as described for Sheet #18, having the following layer Layer 1: consisting of about 100% w/w PLA+SiOx+Cellax®+shellac+lamination; A multilayer laminated sheet is obtained by laminating Sheet #29 to any of the sheets i-xx, as disclosed above for sheet #18.

Sheet #30: A commercially available PLA-SiOx layer (about 20 microns thick) as described above for Sheet #29 underwent shellac coating on the SiOx side and optional lamination as described for Sheet #18.

Layer 1: consisting of about 100% w/w PLA+SiOx+shellac+lamination;

A multilayer laminated sheet is obtained by laminating Sheet #30 to any of the sheets i-xx, as disclosed above for Sheet #18.

Sheet #31: A commercially available cellulose layer (about 20 microns thick) underwent PVDC and thereafter shellac coating as described above for Sheet #27. Next, the coated layer underwent lamination stage were as in Sheet #18.

Layer 1: consisting of about 100% w/w cellulose+PVDC+shellac+lamination;

A multilayer laminated sheet is obtained by laminating Sheet #31 to any of the sheets i-xx, as disclosed above for Sheet #18.

Sheet #32: A commercially available cellulose layer that underwent metallization using aluminum by the vendor (20 microns thick) underwent shellac coating on the metallized side and lamination stage were as in Sheet #18.

Layer 1: consisting of about 100% w/w cellulose+metallization+shellac+lamination; A multilayer laminated sheet is obtained by laminating Sheet #32 to any of the sheets i-xx, as disclosed above for Sheet #18.

Sheet #33: A commercially available metallized cellulose layer as described over for Sheet #32 (20 microns thick) underwent shellac coating on the cellulose side and lamination stage were as in Sheet #18.

Layer 1: consisting of about 100% w/w cellulose+metallization+(shellac+lamination) on the cellulose side;

A multilayer laminated sheet is obtained by laminating Sheet #33 to any of the sheets i-xx, as disclosed above for sheet #18.

Sheet #34: A commercially available metallized cellulose layer as described above for Sheet #32 (20 microns thick) underwent shellac coating on both the cellulose and metallized sides and lamination stage were as in Sheet #18.

Layer 1: consisting of about 100% w/w cellulose+metallization+shellac on both sides+lamination;

A multilayer laminated sheet is obtained by laminating Sheet #27 to any of the sheets i-xx, as disclosed above for sheet #18.

Sheet #35: A PBS layer (60 microns thick) underwent shellac coating on and lamination stage were as in Sheet #18.

Layer 1: consisting of about 100% w/w PBS+shellac+lamination;

Example 4: Three-Layered Coated Biodegradable Sheets

All of the three layered sheets disclosed herein were about 60 microns thick.

Sheet #36: A single layered biodegradable sheet was prepared according to the procedure described above for Sheet #18, wherein the melt extruded materials comprised of 200 gr compound in A, 134 g of commercially available PBAT blend and 200 g of PBSA. The coating procedure included applying thin film of shellac on the 36 microns thick sheet at 3 g/m$^2$ concentration. The film was dried overnight at ambient temperature.

Layer 1: consisting of about 75% w/w PBSA and about 25% w/w PLA;
Layer 2: consisting of about 100% w/w PBAT blend; and
Layer 3: consisting of about 100% w/w PBSA+shellac.

Sheet #37: A single layered biodegradable sheet (36 microns thick) was prepared according to the procedure described above for Sheet #36 was first coated with commercially available nitrocellulose (Cellax®) on the inner side (Compound A), using similar method to the aforementioned shellac coating, and then underwent shellac coating stage as in Sheet #36

Layer 1: consisting of about 75% w/w PBSA and about 25% w/w PLA+Cellax®;
Layer 2: consisting of about 100% w/w PBAT blend; and
Layer 3: consisting of about 100% w/w PBSA+shellac.

Sheet #38: A three layered biodegradable sheet was prepared according to the procedure described above for Sheet #18, consisting only of PBS layers. Sheet #38 was first metalized with aluminum under vacuum and then coated with commercially available nitrocellulose (Cellax®), as described for Sheet #18. The coated side of the sheet was.

Layer 1: consisting of about 100% w/w PBS;
Layer 2: consisting of about 100% w/w PBS; and
Layer 3: consisting of about 100% w/w PBS+metallization+Cellax®.

Sheet #39: A three layered biodegradable sheet was prepared according to the procedure described above for Sheet #38, and further metalized with aluminum Sheet #39 was coated with shellac on the metallized side as for Sheet #18.

Layer 1: consisting of about 100% w/w PBS;
Layer 2: consisting of about 100% w/w PBS; and
Layer 3: consisting of about 100% w/w PBS+Cellax®+metallization+shellac.

Sheet #40: A three layered biodegradable sheet was prepared according to the procedure described above for Sheet #38, wherein the PBS layers were co-extruded with styrene-acrylic epoxy-based chain extender at 0.4%-1% wt, using similar steps as in Sheet #18 followed by metallization with aluminum and shellac coating on the metallized side as for Sheet #18.

Layer 1: consisting of about 100% w/w PBS and chain extender;
Layer 2: consisting of about 100% w/w PBS and chain extender; and
Layer 3: consisting of about 100% w/w PBS and chain extender+metallization+shellac.

Sheet #41: A three layered biodegradable sheet was prepared according to the procedure described above for Sheet #18, wherein the melt extruded materials comprised of 200 gr PBS, 200 g of commercially available PBAT blend and 200 g of PBSA. The three layered sheet was metalized with aluminum and coated with shellac on the metallized side as in Sheet #18.
Layer 1: consisting of about 100% w/w PBSA;
Layer 2: consisting of about 100% w/w PBAT blend; and
Layer 3: consisting of about 100% w/w PBS+metallization+shellac.

Sheet #42: A three layered biodegradable sheet was prepared using co-extrusion of compound A (Sheet #18) and a hydrophobic compound, consisting of about 19.0% w/w PLA, 56.0% w/w PBS and 25.0% w/w PCL that was prepared as follows.
A. Melt Extrusion Compounding Stage:
1. 190 g PLA, 560 g PBS and 250 g PCL were dried overnight at a temperature of 40° C. in a SHINI SCD-160U-120H desiccant dryer;
2. The dried polymers were dry blended and placed in a two screw Collin compounder;
3. The polymers were melt-extruded in the compounder set to the following profile:
1. Temperature profile: 160-175-180-185-190° C. (the Die is set to 190° C.);
2. Screw speed: 200 rpm; and
3. Pressure: 15-25 bar.
B. Cast Co-Extrusion Stage:
1. The melt extruded compounds (A and hydrophobic compound) were dried overnight at a temperature of 40° C. in a desiccant dryer;
2. The compounds, 1 kg of compound A and 1 kg of hydrophobic compound were placed into a Randcastle Extruder set to the following profile:
1. 160-180-185° C.-185° C.—Adaptor; 185° C.—feedblock; Die—185° C.;
2. Screw speed: 80 rpm; and Head pressure 450 bar.

The three layered Sheet #25 consists of the following three layers:
Layer 1 (15 microns thick): consisting of about 75% w/w PBSA and about 25% w/w PLA+shellac;
Layer 2 (15 microns thick): consisting of about 75% w/w PBSA and about 25% w/w PLA; and
Layer 3 (30 microns thick): consisting of about 19% w/w PLA, 56% w/w PBS and about 25% w/w PCL.

Sheet #42 underwent shellac or nitrocellulose coating on the outer side as for Sheet #18.

Sheet #43: A three layered biodegradable sheet was prepared according to the procedure described above for Sheet #42, with a hydrophobic compound consisting of about 19.0% w/w PBSA, 56.0% w/w PBS and 25.0% w/w PCL. The three layered Sheet #43 consists of the following three layers:
Layer 1 (15 microns thick): consisting of about 75% w/w PBSA and about 25% w/w PLA+shellac;
Layer 2 (15 microns thick): consisting of about 75% w/w PBSA and about 25% w/w PLA; and
Layer 3 (30 microns thick): consisting of about 19% w/w PBSA, 56% w/w PBS and about 25% w/w PCL.

Sheet #43 underwent shellac or nitrocellulose coating on the outer side as for Sheet #18.

Sheet #44: A three layered biodegradable sheet was prepared according to the procedure described above for Sheet #42, with a hydrophobic compound, consisting of about 19.0% w/w PLA, 56.0% w/w PBAT and 25.0% w/w PCL. The three layered Sheet #44 consists of the following three layers:
Layer 1 (15 microns thick): consisting of about 75% w/w PBSA and about 25% w/w PLA+shellac;
Layer 2 (15 microns thick): consisting of about 75% w/w PBSA and about 25% w/w PLA; and
Layer 3 (30 microns thick): consisting of about 19% w/w PLA, 56% w/w PBAT and about 25% w/w PCL.

Sheet #44 underwent shellac or nitrocellulose coating on the outer side as for Sheet #18.

Sheet #45: A three layered biodegradable sheet was prepared according to the procedure described above for Sheet #42, with the hydrophobic compound, consisting of about 60.0% w/w PLA and 40.0% w/w PCL. The three layered Sheet #45 consists of the following three layers:
Layer 1 (15 microns thick): consisting of about 75% w/w PBSA and about 25% w/w PLA+shellac;
Layer 2 (15 microns thick): consisting of about 75% w/w PBSA and about 25% w/w PLA; and
Layer 3 (30 microns thick): consisting of about 60% w/w PLA and about 40% w/w PCL.

Sheet #45 underwent shellac or nitrocellulose coating on the outer side as for Sheet #18.

Sheet #46: A three layered biodegradable sheet was prepared according to the procedure described above for Sheet #42, with the hydrophobic compound, consisting of about 60.0% w/w PBAT and 40.0% w/w PCL. The three layered Sheet #46 consists of the following three layers:
Layer 1 (15 microns thick): consisting of about 75% w/w PBSA and about 25% w/w PLA+shellac;
Layer 2 (15 microns thick): consisting of about 75% w/w PBSA and about 25% w/w PLA; and
Layer 3 (30 microns thick): consisting of about 60% w/w PBAT and about 40% w/w PCL.

Sheet #46 underwent shellac or nitrocellulose coating on the outer side as for Sheet #18.

Sheet #47: A three layered biodegradable sheet was prepared according to the procedure described above for Sheet #42, with the hydrophobic compound consisting of about 60.0% w/w PBSA and 40.0% w/w PCL. The three layered Sheet #47 consists of the following three layers:
Layer 1 (15 microns thick): consisting of about 75% w/w PBSA and about 25% w/w PLA+shellac;
Layer 2 (15 microns thick): consisting of about 75% w/w PBSA and about 25% w/w PLA; and
Layer 3 (30 microns thick): consisting of about 60% w/w PBSA and about 40% w/w PCL.

Sheet #47 underwent shellac or nitrocellulose coating on the outer side as for Sheet #18.

Sheet #48: A three layered biodegradable sheet was prepared according to the procedure described above for Sheet #42, with the hydrophobic compound consisting of about 60.0% w/w PBS and 40.0% w/w PCL. The three layered Sheet #48 consists of the following three layers:
Layer 1 (15 microns thick): consisting of about 75% w/w PBSA and about 25% w/w PLA+shellac;
Layer 2 (15 microns thick): consisting of about 75% w/w PBSA and about 25% w/w PLA; and
Layer 3 (30 microns thick): consisting of about 60% w/w PBS and about 40% w/w PCL.

Next, Sheet #48 underwent shellac or nitrocellulose coating on the outer side as for Sheet #18.

Sheet #49: A three layered biodegradable sheet was prepared according to the procedure described above for Sheet #42, with the co-extrusion with PBS and the hydrophobic compound. The three layered Sheet #49 consists of the following three layers:
Layer 1 (15 microns thick): consisting of about 100% w/w PBS+shellac;
Layer 2 (15 microns thick): consisting of about 100% w/w PBS; and
Layer 3 (30 microns thick): consisting of about 19% w/w PLA, 56% w/w PBS and about 25% w/w PCL.

Next, Sheet #49 underwent shellac or nitrocellulose coating on the outer side as for Sheet #18.

Sheet #50: A three layered biodegradable sheet was prepared according to the procedure described above for Sheet #42, with co-extrusion with PBS and a hydrophobic compound consisting of about 19.0% w/w PBSA, 56.0% w/w PBS and 25.0% w/w PCL. The three layered Sheet #50 consists of the following three layers:
Layer 1 (15 microns thick): consisting of about 100% w/w PBS+shellac;
Layer 2 (15 microns thick): consisting of about 100% w/w PBS; and
Layer 3 (30 microns thick): consisting of about 19% w/w PBSA, 56% w/w PBS and about 25% w/w PCL.

Next, Sheet #50 underwent shellac or nitrocellulose coating on the outer side as for Sheet #18.

Sheet #51: A three layered biodegradable sheet was prepared according to the procedure described above for Sheet #42, with co-extrusion with PBS and a hydrophobic compound consisting of about 19.0% w/w PLA, 56.0% w/w PBAT and 25.0% w/w PCL. The three layered Sheet #51 consists of the following three layers:
Layer 1 (15 microns thick): consisting of about 100% w/w PBS+shellac;
Layer 2 (15 microns thick): consisting of about 100% w/w PBS; and
Layer 3 (30 microns thick): consisting of about 19% w/w PLA, 56% w/w PBAT and about 25% w/w PCL.

Next, Sheet #51 underwent shellac or nitrocellulose coating on the outer side as for Sheet #18.

Sheet #52: A three layered biodegradable sheet was prepared according to the procedure described above for Sheet #42, with co-extrusion with PBS and a hydrophobic compound consisting of about 60.0% w/w PLA and 40.0% w/w PCL. The three layered Sheet #52 consists of the following three layers:
Layer 1 (15 microns thick): consisting of about 100% w/w PBS+shellac;
Layer 2 (15 microns thick): consisting of about 100% w/w PBS; and
Layer 3 (30 microns thick): consisting of about 60% w/w PLA and about 40% w/w PCL.

Next, Sheet #52 underwent shellac or nitrocellulose coating on the outer side as for Sheet #18.

Sheet #53: A three layered biodegradable sheet was prepared according to the procedure described above for Sheet #42, with co-extrusion with PBS and a hydrophobic compound, consisting of about 60.0% w/w PBAT and 40.0% w/w PCL.

The three layered Sheet #53 consists of the following three layers:
Layer 1 (15 microns thick): consisting of about 100% w/w PBS+shellac;
Layer 2 (15 microns thick): consisting of about 100% w/w PBS; and
Layer 3 (30 microns thick): consisting of about 60% w/w PBAT and about 40% w/w PCL.

Next, Sheet #53 underwent shellac or nitrocellulose coating on the outer side as for Sheet #18.

Sheet #54: A three layered biodegradable sheet was prepared according to the procedure described above for Sheet #42, with co-extrusion with PBS and a hydrophobic compound consisting of about 60.0% w/w PBSA and 40.0% w/w PCL. The three layered Sheet #54 consists of the following three layers:
Layer 1 (15 microns thick): consisting of about 100% w/w PBS+shellac;
Layer 2 (15 microns thick): consisting of about 100% w/w PBS; and
Layer 3 (30 microns thick): consisting of about 60% w/w PBSA and about 40% w/w PCL.

Next, Sheet #54 underwent shellac or nitrocellulose coating on the outer side as for Sheet #18.

Sheet #55: A three layered biodegradable sheet was prepared according to the procedure described above for Sheet #42, with co-extrusion with PBS and a hydrophobic compound consisting of about 60.0% w/w PBS and 40.0% w/w PCL. The three layered Sheet #55 consists of the following three layers:
Layer 1 (15 microns thick): consisting of about 100% w/w PBS+shellac;
Layer 2 (15 microns thick): consisting of about 100% w/w PBS; and
Layer 3 (30 microns thick): consisting of about 60% w/w PBS and about 40% w/w PCL.

Next, Sheet #55 underwent shellac or nitrocellulose coating on the outer side as in Sheet #18.

Example 5: Five-Layered Coated Biodegradable Sheets

All of the five layered sheets disclosed herein were 60 microns thick.

Sheet #56: A five layered biodegradable sheet was prepared using co-extrusion, wherein the layers 1 and 5 consist of the hydrophobic compound of about 19.0% w/w PLA, 56.0% w/w PBS and 25.0% w/w PCL that was prepared according to the procedure described above for Sheet #42. Layers 2 and 4 consists of commercially available adhesive resin, serving as a tie layer, and Layer 3 consists of 100% w/w PVOH.

The thickness of each of layers 1 and 5 constitutes about 35% of the total thickness, the thickness of each of layers 2 and 4 constitutes about 8% of the thickness final sheet, and the thickness of layer 3 constitutes about 14% of the thickness of the final sheet.

Sheet #56 underwent shellac or nitrocellulose coating on the outer side as in Sheet #18.
Layer 1: consisting of about 19% w/w PLA, 56% w/w PBS and about 25% w/w PCL+shellac;
Layer 2: consisting of about 100% tie layer; and
Layer 3: consisting of about 100% w/w PVOH; and
Layer 4: consisting of about 100% tie layer; and
Layer 5: consisting of about 19% w/w PLA, 56% w/w PBS and about 25% w/w PCL.

Sheet #57: A five layered biodegradable sheet was prepared as described above for Sheet #56, with the hydrophobic compound consisting of about 19.0% w/w PBSA, 56.0% w/w PBS and 25.0% w/w PCL.

Layer 1: consisting of about 19% w/w PBSA, 56% w/w PBS and about 25% w/w PCL+shellac or nitrocellulose;
Layer 2: consisting of about 100% tie layer; and
Layer 3: consisting of about 100% w/w PVOH; and
Layer 4: consisting of about 100% tie layer; and
Layer 5: consisting of about 19% w/w PBSA, 56% w/w PBS and about 25% w/w PCL.

Sheet #58: A five layered biodegradable sheet was prepared as described above for Sheet #56, with a hydrophobic compound consisting of about 19.0% w/w PLA, 56.0% w/w PBAT and 25.0% w/w PCL.
Layer 1: consisting of about 19% w/w PLA, 56% w/w PBAT and about 25% w/w PCL+shellac or nitrocellulose;
Layer 2: consisting of about 100% tie layer; and
Layer 3: consisting of about 100% w/w PVOH; and
Layer 4: consisting of about 100% tie layer; and
Layer 5: consisting of about 19% w/w PLA, 56% w/w PBAT and about 25% w/w PCL.

Sheet #59: A five layered biodegradable sheet was prepared as described above for Sheet #56, with a hydrophobic compound consisting of about 60.0% w/w PLA and 40.0% w/w PCL.
Layer 1: consisting of about 60% w/w PLA and about 40% w/w PCL+shellac;
Layer 2: consisting of about 100% tie layer; and
Layer 3: consisting of about 100% w/w PVOH; and
Layer 4: consisting of about 100% tie layer; and
Layer 5: consisting of about 60% w/w PLA and about 40% w/w PCL.

Sheet #60: A five layered biodegradable sheet was prepared as described above for Sheet #56, with a hydrophobic compound, consisting of about 60.0% w/w PBSA and 40.0% w/w PCL.
Layer 1: consisting of about 60% w/w PBSA and about 40% w/w PCL+shellac or nitrocellulose;
Layer 2: consisting of about 100% tie layer; and
Layer 3: consisting of about 100% w/w PVOH; and
Layer 4: consisting of about 100% tie layer; and
Layer 5: consisting of about 60% w/w PBSA and about 40% w/w PCL.

Sheet #61: A five layered biodegradable sheet was prepared as described above for Sheet #56, with a hydrophobic compound consisting of about 60.0% w/w PBAT and 40.0% w/w PCL.
Layer 1: consisting of about 60% w/w PBAT and about 40% w/w PCL+shellac or nitrocellulose;
Layer 2: consisting of about 100% tie layer; and
Layer 3: consisting of about 100% w/w PVOH; and
Layer 4: consisting of about 100% tie layer; and
Layer 5: consisting of about 60% w/w PBAT and about 40% w/w PCL.

Sheet #62: A five layered biodegradable sheet was prepared as described above for Sheet #56, with a hydrophobic compound consisting of about 60.0% w/w PBS and 40.0% w/w PCL.
Layer 1: consisting of about 60% w/w PBS and about 40% w/w PCL+shellac;
Layer 2: consisting of about 100% tie layer; and
Layer 3: consisting of about 100% w/w PVOH; and
Layer 4: consisting of about 100% tie layer; and
Layer 5: consisting of about 60% w/w PBS and about 40% w/w PCL.

Example 6: Biodegradable Double Laminates with Coated Biodegradable Sheets

Sheet #63: A commercially available aluminum metalized cellulose layer (about 20 microns thick) and laminated, using biodegradable water-based adhesive (e.g. Epotal 2 g/m$^2$) to a commercially available aluminum metalized PLA (20 microns thick) (bilayer) and then coated with a thin film coating of shellac at 3 g/m$^2$ concentration on the metalized side. Next, the film was laminated on the shellac side with biodegradable water-based adhesive (e.g. Epotal®) to a three layered biodegradable sheet (36 microns thick) that was prepared according to the procedure described above for Sheet #18. The co-extrusion step included 200 g of compound A, 134 g of commercially available PBAT blend and 200 g of PBSA, using similar steps as for Sheet #18, B.
Layer 1: consisting of about 100% w/w metalized cellulose;
Adhesive layer
Layer 2: consisting of about 100% w/w metalized PLA+shellac;
Adhesive layer (on shellac)
Layer 1: consisting of about 75% w/w PBSA and about 25% w/w PLA;
Layer 2: consisting of about 100% w/w PBAT blend; and
Layer 3: consisting of about 100% w/w PBSA.

Sheet #64: A three layered biodegradable sheet (15-100 microns thick) was prepared according to the procedure described above for Sheet #18, wherein at the co-extrusion step included 200 g of PBS, 200 g of commercially available PBAT blend and 200 g of PBS, using similar steps as in Sheet #18, B, which was coated with commercially available nitrocellulose (Cellax®) and laminated, using biodegradable water-based adhesive (e.g. Epotal 2 g/m$^2$) to a commercially available aluminum metalized PLA (20 microns thick) and coated with a thin film coating of shellac at 3 g/m$^2$ concentration on the metalized side. Next, the film was laminated on the shellac side with biodegradable water-based adhesive to a three layered biodegradable sheet (36 microns thick) that was prepared according to the procedure described above for Sheet #18, wherein at the co-extrusion step included 200 g of compound A, 134 g of commercially available PBAT blend and 200 g of PBSA, using similar steps as in Sheet #18, B.
Layer 1: consisting of about 100% w/w PBS;
Layer 2: consisting of about 100% w/w PBAT blend;
Layer 3: consisting of about 100% w/w PBS+Cellax®;
Adhesive layer (on Cellax®)
Layer 1: consisting of about 100% w/w PLA+metallization+shellac;
Adhesive layer (on shellac)
Layer 1: consisting of about 75% w/w PBSA and about 25% w/w PLA;
Layer 2: consisting of about 100% w/w PBAT blend; and
Layer 3: consisting of about 100% w/w PBSA.

Sheet #65: A three layered biodegradable sheet (23 microns thick) was prepared according to the procedure described above for Sheet #18, wherein the co-extrusion step included 200 g of PBS, 200 g of commercially available PBAT blend and 200 g of PBS, using similar steps as in Sheet #18, B, which was coated with commercially available nitrocellulose (Cellax®) and laminated, using biodegradable water-based adhesive (e.g. Epotal 2 g/m$^2$) to a commercially available aluminum metalized PLA (30 microns thick) and then coated with a thin film coating of shellac at 3 g/m$^2$ concentration on the metalized side. Next, the film was laminated on the shellac side with biodegradable water-based adhesive to a three layered biodegradable sheet (15-100 microns thick) that was prepared according to the procedure described above for Sheet #18, wherein at the co-extrusion step included 200 g of compound A, 200 g of compound A and 200 g of a hydrophobic compound consisting of about 19.0% w/w PLA, 56.0% w/w PBS and 25.0% w/w PCL, using similar steps as in Sheet #42.
Layer 1: consisting of about 100% w/w PBS;
Layer 2: consisting of about 100% w/w PBAT blend;
Layer 3: consisting of about 100% w/w PBS+Cellax®;
Adhesive layer (on Cellax®)
Layer 1: consisting of about 100% w/w PLA+metallization+shellac;
Adhesive layer (on shellac)
Layer 1: consisting of about 75% w/w PBSA and about 25% w/w PLA;
Layer 2: consisting of about 75% w/w PBSA and about 25% w/w PLA; and
Layer 3: consisting of about 19% w/w PLA, 56% w/w PBS and about 25% w/w PCL.

A similar laminate was also produced as follows, in which the inner film was replaced with the following films:
Layer 1: consisting of about 75% w/w PBSA and about 25% w/w PLA;
Layer 2: consisting of about 100% w/w PBAT; and
Layer 3: consisting of about 100% w/w PBSA;
or
Layer 1: consisting of about 90% w/w PBAT and about 10% w/w PLA;
or
Layer 1: consisting of about 75% w/w PBSA and about 25% w/w PLA;
Layer 2: consisting of about 100% w/w PBAT;
Layer 3: consisting of about 100% w/w PHA;
Layer 4: consisting of about 100% w/w PBAT;
Layer 5: consisting of about 100% w/w PBSA;
or
Layer 1: consisting of about 75% w/w PBSA and about 25% w/w PLA;
Layer 2: consisting of about 100% w/w PBAT;
Layer 3: consisting of about 100% w/w PHA;
Layer 4: consisting of about 100% w/w PBAT;
Layer 5: consisting of about 19% w/w PLA, 56% w/w PBS and about 25% w/w PCL;
or
Layer 1: consisting of about 75% w/w PBSA and about 25% w/w PLA;
Layer 2: consisting of about 100% w/w PBAT;
Layer 3: consisting of about 100% w/w PHA.

A similar laminate was also produced as follows, in which the outer film was replaced with the following films:
Layer 1: consisting of about 75% w/w PBSA and about 25% w/w PLA;
Layer 2: consisting of about 100% w/w PBAT; and
Layer 3: consisting of about 100% w/w PBSA;
or
Layer 1: consisting of about 100% w/w cellulose+metallization;
or
Layer 1: consisting of about 100% w/w PBSA;
Layer 2: consisting of about 75% w/w PBSA and about 25% w/w PLA; and
Layer 3: consisting of about 100% w/w PBSA.

Sheet #66: A commercially available aluminum metalized PLA (23 microns thick) was coated with a thin film coating of shellac at 3 g/m² concentration on the metalized side. It was laminated, using biodegradable water-based adhesive (e.gt. Epotal 2 g/m²) to a commercially available aluminum metalized cellulose (23 microns thick). Next, the film was laminated on the metallized side with biodegradable water-based adhesive to a three layered biodegradable sheet (15-100 microns thick) that was prepared according to the procedure described above for Sheet #18, wherein at the co-extrusion step included 200 g of compound A, 200 g of compound in Sheet #18, A and 200 g of and the hydrophobic compound, consisting of about 19.0% w/w PLA, 56.0% w/w PBS and 25.0% w/w PCL, using similar steps as for Sheet #42.
Layer 1: consisting of about 100% w/w PLA+metallization+shellac; Adhesive layer (on shellac)
Layer 1: consisting of about 100% cellulose+metallization; Adhesive layer (on metallization)
Layer 1: consisting of about 75% w/w PBSA and about 25% w/w PLA;
Layer 2: consisting of about 75% w/w PBSA and about 25% w/w PLA; and
Layer 3: consisting of about 19% w/w PLA, 56% w/w PBS and about 25% w/w PCL;

This laminate was also produced as follows, in which the inner film was replaced with the following films:
Layer 1: consisting of about 75% w/w PBSA and about 25% w/w PLA;
Layer 2: consisting of about 100% w/w PBAT; and
Layer 3: consisting of about 100% w/w PBSA;
or
Layer 1: consisting of about 90% w/w PBAT and about 10% w/w PLA;
or
Layer 1: consisting of about 75% w/w PBSA and about 25% w/w PLA;
Layer 2: consisting of about 100% w/w PBAT;
Layer 3: consisting of about 100% w/w PHA;
Layer 4: consisting of about 100% w/w PBAT;
Layer 5: consisting of about 100% w/w PBSA;
or
Layer 1: consisting of about 75% w/w PBSA and about 25% w/w PLA;
Layer 2: consisting of about 100% w/w PBAT;
Layer 3: consisting of about 100% w/w PHA;
Layer 4: consisting of about 100% w/w PBAT;
Layer 5: consisting of about 19% w/w PLA, 56% w/w PBS and about 25% w/w PCL;
or
Layer 1: consisting of about 75% w/w PBSA and about 25% w/w PLA;
Layer 2: consisting of about 100% w/w PBAT;
Layer 3: consisting of about 100% w/w PHA;

This laminate was also produced as follows, in which the inner film was replaced with the following films:
Layer 1: consisting of about 75% w/w PBSA and about 25% w/w PLA;
Layer 2: consisting of about 100% w/w PBAT;
Layer 3: consisting of about 100% w/w PHA;
Layer 4: consisting of about 100% w/w PBAT;
Layer 5: consisting of about 100% w/w PBSA;
or
Layer 1: consisting of about 75% w/w PBSA and about 25% w/w PLA;
Layer 2: consisting of about 100% w/w PBAT;
Layer 3: consisting of about 100% w/w PHA;
Layer 4: consisting of about 100% w/w PBAT;
Layer 5: consisting of about 19% w/w PLA, 56% w/w PBS and about 25% w/w PCL;
or
Layer 1: consisting of about 75% w/w PBSA and about 25% w/w PLA;
Layer 2: consisting of about 100% w/w PBAT;

Layer 3: consisting of about 100% w/w PHA.

Example 7: Biodegradable Sheets Coated with Siloxane Mixture

All of the multilayer sheets disclosed herein were about 15-120 microns thick, and coated with siloxane mixture using the plasma surface treatment. This step was done by a RF generator who creates a plasma flow of energetic radicals which bombarding the surface of an object.

The object is placed at a low vacuum environment in a vacuum chamber for the entire process.

The process include a short plasma treatment cycle for cleaning purposes and another plasma treatment cycle of plasma deposition of siloxane mixture (two different chemistry where tested) that attached to the surface.

The entire process is last for few minutes (1 or 2) and the buildup layer thickness is in the order of dozens of nanometers. Longer treatment would create cracks that will increase the WVRT results. There is a possibility to control the buildup rate of the coating layer.

Sheet #67: A three layered biodegradable sheet (60 microns thick) was prepared according to the procedure described above for Sheet #18, wherein at the co-extrusion step 200 g of compound A, 200 g of PVOH and 200 g of compound A were co-extruded with 0.4% wt of the styrene-acrylic epoxy-based chain extender, using similar steps as in Sheet #18. Next, the sheet was coated with siloxane mixture on Layer 3.
Layer 1: consisting of about 75% w/w PBSA and about 25% w/w and chain extender;
Layer 2: consisting of about 100% w/w PVOH and chain extender; and
Layer 3: consisting of about 75% w/w PBSA and about 25% w/w PLA and chain extender+siloxane mixture coating The measured barrier properties of Sheet #67 were as follows:
Barrier Properties

| water vapor transmittance rate (WVTR) [g/(m2 · d)] | 7.5 | ASTM E96 |
| oxygen transmittance rate (OTR) [cm3/(m2 · d · bar)] | 119 | ASTM D3985 |

The WVTR permeability properties if the same sheet without the siloxane mixture coating were considerably higher:

| water vapor transmittance rate (WVTR) [g/(m2 · d)] | 296 | ASTM E96 |

Sheet #68: A three layered biodegradable sheet (60 microns thick) was prepared according to the procedure described above for Sheet #18, wherein at the co-extrusion step 120-240 g of PBS, 120-360 g of compound A and 120-240 g of PBSA were co-extruded using similar steps as in Sheet #18. Next, the sheet was coated with siloxane mixture on Layer 3.
Layer 1: consisting of about 100% w/w PBS;
Layer 2: consisting of about 75% w/w PBSA and about 25% w/w; and
Layer 3: consisting of about 100% w/w PBSA+siloxane mixture coating The measured barrier properties of Sheet #51 were as follows:
Barrier Properties

| water vapor transmittance rate (WVTR) [g/(m2 · d)] | 124 | ASTM E96 |
| oxygen transmittance rate (OTR) [cm3/(m2 · d · bar)] | 88 | ASTM D3985 |

The WVTR and OTR permeability properties if the same sheet without the siloxane mixture coating were considerably higher:

| water vapor transmittance rate (WVTR) [g/(m2 · d)] | >906 | ASTM E96 |
| oxygen transmittance rate (OTR) [cm3/(m2 · d · bar)] | 1036 | ASTM D3985 |

Example 8: Metallized Biodegradable Sheets Coated with Shellac

Sheet #69: A three layered biodegradable sheet (about 60 microns thick) was prepared according to the procedure described above for Sheet #18, with the following modification: the cast co-extrusion stage included 120-240 g of compound in Sheet #18, A, 120-360 g of compound in Sheet #18, A and 120-240 g PBSA. The sheet underwent direct metallization using aluminum by the vendor on Layer 1 and then shellac coating as in Sheet #18, on both the outer sides of the sheet.
Layer 1: consisting of about 75% w/w PBSA and about 25% w/w PLA+metallization+shellac;
Layer 2: consisting of about 75% w/w PBSA and about 25% w/w PLA; and
Layer 3: consisting of about 100% w/w PBSA+shellac The measured barrier properties of Sheet #69 were as follows:
Barrier Properties

| water vapor transmittance rate (WVTR) [g/(m2 · d)] | 7.9 | ASTM E96 |
| oxygen transmittance rate (OTR) [cm3/(m2 · d · bar)] | 6 | ASTM D3985 |

The WVTR permeability properties if the same sheet without the siloxane mixture coating were considerably higher:

| water vapor transmittance rate (WVTR) [g/(m2 · d)] | 60 | ASTM E96 |

Example 9: Biodegradable Sheets Coated with Shellac

Sheet #70: A two layered biodegradable sheet was prepared by co-extrusion of PBS and a hydrophobic compound, consisting of about 60% w/w PLA, and 40% w/w PCL. The hydrophobic compound was prepared as follows.
A. Melt Extrusion Compounding Stage:
1. 600 g PLA and 400 g PCL were dried overnight at a temperature of 40° C. in a SHINI SCD-160U-120H desiccant dryer;
2. The dried polymers were dry blended and placed in a two screw Collin compounder;
3. The polymers were melt-extruded in the compounder set to the following profile:

1. Temperature profile: 160-175-180-185-190° C. (the Die is set to 190° C.);
2. Screw speed: 200 rpm; and
3. Pressure: 15-25 bar.

B. Cast Co-Extrusion Stage:
1. The PBS and the hydrophobic compound were both dried overnight at a temperature of 40° C. in a desiccant dryer;
2. The dried materials, 1 kg of PBS and 1 kg of hydrophobic compound were placed each into a different extruder of a Randcastle coextrusion line set to the following profile:
1. Extruders 160-180-185° C.-185° C.—Adaptor; 185° C.—feedblock; Die—185° C.;
2. Screw speed: 80 rpm; and Head pressure 450 bar.

The two layered Sheet #70 consists of the following two layers:
Layer 1 (10-20 microns thick): consisting of about 60% w/w PLA and about 40% w/w PCL;
Layer 2 (10-30 microns thick): consisting of about 100% w/w PBS Some samples of Sheet #70 received shellac coating on layer 1, and others on layer 2 as shown above. Reference samples were left uncoated.

Sheet #70 barrier properties were next tested as follows, with or without shellac coating.

Barrier Properties

Water vapor transmittance rate (WVTR) [g/(m2·d)] was tested according to ASTM E96 The WVTR permeability properties were improved in both cases after the application of the shellac coating, however to a different extent, as shown in Table 3

Sheet #70:
Layer 1 (15 microns thick): consisting of about 60% w/w PLA and about 40% w/w PCL with or without shellac coating;
Layer 2 (20 microns thick): consisting of about 100% w/w PBS with or without shellac coating

TABLE 3

| Layer | WVTR [g/(m2 · d)] |
|---|---|
| PBS side not coated [neither side coated] | 180 |
| PBS coated with shellac [only PBS side coated] | 90 |
| Hydrophobic compound side not coated [only hydrophobic side coated] | 107 |
| Hydrophobic compound side coated [both sides coated] | 81 |

Sheet #71 A three-layered biodegradable sheet consisting of compound A and PBSA was prepared as follows:
A. Melt extrusion compounding stage of compound A was prepared as mentioned above:
1. 50 gr PLA and 150 gr PBSA were dried overnight at a temperature of 50° C. under vacuum;
2. the dried polymers were dry blended and placed in a two screw PRISM compounder;
3. the polymers were melt extruded in the PRISM compounder set to the following profile:
i) temperature profile: 170-175-180-185-190° C. (the Die is set to 190° C.);
ii) screw speed: 250 rpm; and
iii) pressure: 15-25 bar;
to generate "compound A"

B) Cast co-extrusion stage:
1. The melt extruded materials comprised of 300 gr compound A and 200 gr PBSA were dried overnight at a temperature of 50° C. under vacuum on a Shini SCD-160U-120H dryer;
2. The materials were placed into different extruders/layers of a Collin co-extrusion line, and set to the following profile:
Extruder A) 190-200-220° C.-200° C.—Adaptor; 220° C.—feedblock; Die—210° C.; screw speed: 80 rpm
Extruder B) 190-220-230° C.-200° C.—Adaptor; 230° C.—feedblock; Die—230° C.; screw speed: 45 rpm
Extruder C) 190-200-220° C.-200° C.—Adaptor; 220° C.—feedblock; Die—210° C.; screw speed: 80 rpm
Head pressure 50 bar.

A 50 microns thick 3-layer sheet was generated having the following layers:
Layer 1: consisting of about 100% w/w PBSA;
Layer 2: consisting of about 75% w/w PBSA and about 25% w/w PLA; and
Layer 3: consisting of about 100% w/w PBSA.

Sheet #71 was next tested for its mechanical properties (ASTM D882) and heat seal (ASTM F2029), as shown in Tables 4A and 4B, respectively.

TABLE 4A

| Tensile | | | | | |
|---|---|---|---|---|---|
| Young's Modulus (MPa) | | Stress at Break (MPa) | | Percentage Strain at Break | |
| MD | TD | MD | TD | MD | TD |
| 642 | 715 | 26 | 16 | 194 | 4 |

MD and TD denote for machine direction and trans-machine direction

TABLE 4B

| Heat Seal | | |
|---|---|---|
| Sealing Temp - 1 sec (° C.) | Average Seal strength N/25 mm | min-max seal strength |
| 80-120 | 33.5 | 35-32 |

Sheet #72:
Sheet #70 (about 25 microns thick) was co-extruded, optionally coated with a thin film coating of shellac at 3 g/m² concentration on either the PBS or the hydrophobic compound side, and then adhesive laminated, using biodegradable water-based adhesive (e.g. Epotal 2 g/m²) to the co-extruded Sheet #71
Layer 1 (15 microns thick): consisting of about 60% w/w PLA and about 40% w/w PCL with or without shellac coating;
Layer 2 (20 microns thick): consisting of about 100% w/w PBS with or without shellac coating
Adhesive Layer
Layer 1 (10 microns thick): consisting of about 100% w/w PBSA;
Layer 2 (30 microns thick): consisting of about 75% w/w PBSA and about 25% w/w PLA; and
Layer 3 (10 microns thick): consisting of about 100% w/w PBSA.

Barrier Properties of Sheet #72
Water vapor transmittance rate (WVTR) [g/(m2·d)] was tested according to ASTM E96. The WVTR permeability properties were improved in both cases after the application of the shellac coating, however when coated on the laminated layer (PBS) the impact on the WVTR was more significant, as shown in Table 5

TABLE 5

| Layer | WVTR [g/(m2 · d)] |
|---|---|
| No coating | 88 |
| PBS coated with shellac | 75 |
| Hydrophobic compound side coated with shellac | 87 |

Sheet #73:

Sheet #70 (about 25 microns thick), after co-extrusion, underwent vacuum metallization using aluminum, further optionally coated with a thin film coating of shellac at 3 g/m$^2$ concentration on either the PBS or the hydrophobic compound side, and then adhesive laminated, using biodegradable water-based adhesive (e.g. Epotal 2 g/m$^2$) to the co-extruded Sheet #71. This provided the following laminated structure:

Layer 1 (15 microns thick): consisting of about 60% w/w PLA and about 40% w/w PCL;
Layer 2 (20 microns thick): consisting of about 100% w/w PBS+metallization with or without shellac coating
Adhesive Layer
Layer 1 (10 microns thick): consisting of about 100% w/w PBSA;
Layer 2 (30 microns thick): consisting of about 75% w/w PBSA and about 25% w/w PLA; and
Layer 3 (10 microns thick): consisting of about 100% w/w PBSA.

Barrier Properties of Sheet #73

Water vapor transmittance rate (WVTR) [g/(m2·d)] was tested according to ASTM E96. The WVTR permeability properties were tested on day 0 and after 10 days of incubation of the films in the environmental cabinet (40° C., 60 RH). It was shown improved in both cases after the application of metallization and with the application of shellac coating, however the addition of shellac coating resulted with a somewhat more stable, as the increase over the incubation was only 125%, vs. 150% in the metallized film without shellac coating, shown in Table 6:

TABLE 6

| | WVTR [g/(m2 · d)] | |
|---|---|---|
| Layer | Day 0 | After 10 days in environmental cabinet (40° C./60 RH) |
| Metallization on PBS without coating | 4.4 | 11.0 |
| PBS metallized and coated with shellac | 4.8 | 10.8 |

Sheet #74: A three layered biodegradable sheet was prepared using co-extrusion of PBAT and a hydrophobic compound, consisting of about 60% w/w PLA, and 40% w/w PCL that was prepared as follows.
A. Melt extrusion compounding stage was performed as abovementioned for the hydrophobic compound:
B. Cast co-extrusion stage:
1. The melt extruded PBAT and hydrophobic compound were dried overnight at a temperature of 40° C. in a desiccant dryer;
2. The compounds, 2 kg of PBAT and 1 kg of hydrophobic compound were placed into a Randcastle coextrusion line set to the following profile:
3. Extruders 160-180-185° C.-185° C.—Adaptor; 185° C.—feedblock; Die—185° C.;
4. Screw speed: 80 rpm; and Head pressure 450 bar.

The three layered Sheet #75 consists of the following three layers:
Layer 1 (5-10 microns thick): consisting of about 60% w/w PLA and about 40% w/w PCL;
Layer 2 (20-30 microns thick): consisting of about 100% w/w PBAT;
Layer 3 (5-10 microns thick): consisting of about 60% w/w PLA and about 40% w/w PCL.

Sheet #74 could also be prepared using up to 5% impact modifier (plasticizer) in the co-extrusion process, such as PCL. In addition, the hydrophobic compound could be prepared in a range of proportion between PLA and PCL, using the same aforementioned procedure:
Layer 1 (5-10 microns thick): consisting of about 55%-65%% w/w PLA and about 35%-45% w/w PCL;
Layer 2 (20-30 microns thick): consisting of about 100% w/w PBAT (with up to 5% impact modifier (plasticizer));
Layer 3 (5-10 microns thick): consisting of about 55%-65%% w/w PLA and about 35%-45% w/w PCL.

Sheet #74 was next tested for its mechanical properties (ASTM D882), impact resistance (ASTM D1709), heat seal (ASTM F2029) and water vapor transmittance rate (WVTR; ASTM E96), shown in Tables 7A and 7B:

TABLE 7A

| Tensile | | | | | |
|---|---|---|---|---|---|
| Young's Modulus (MPa) | | Stress at Break (MPa) | | Percentage Strain at Break | |
| MD | TD | MD | TD | MD | TD |
| 679 | 594 | 26 | 20 | 310 | 350 |

MD and TD denote for machine direction and trans-machine direction

Impact resistance was 578 g, WVTR was 48.5 [g/(m2·d)]

TABLE 7B

| Heat Seal | | |
|---|---|---|
| Sealing Temp - 1 sec (° C.) | Average Seal strength N/25 mm | min-max seal strength |
| 80-130 | 17 | 12-20 |

Sheet #75: A three layered biodegradable sheet was prepared using co-extrusion of PBS and PLA that was prepared as follows.
Cast Co-Extrusion:
1. The PBS and PLA were dried overnight at a temperature of 40° C. in a desiccant dryer;
2. The materials, 1 kg of PBS and approx. 1 kg of PLA were placed into a Randcastle coextrusion line set to the following profile:
3. Extruders 160-180-185° C.-185° C.—Adaptor; 185° C.—feedblock; Die—185° C.;
4. Screw speed: 80 rpm; and Head pressure 450 bar.

The three layered Sheet #75 consisted of the following three layers:

Layer 1 (5-10 microns thick): consisting of about 100% w/w PBS;
Layer 2 (10-20 microns thick): consisting of about 100% w/w PBS;
Layer 3 (5-10 microns thick): consisting of about 100% w/w PLA.

Sheet #75 (about 25 microns thick) was co-extruded, and then optionally coated with a thin film coating of shellac at 3 g/m² concentration on the PBS side.
Layer 1 (6 microns thick): consisting of about 100% w/w PBS with shellac;
Layer 2 (14 microns thick): consisting of about 100% w/w PBS;
Layer 3 (5 microns thick): consisting of about 100% w/w PLA.

Barrier Properties of Sheet #75

Water vapor transmittance rate (WVTR) [g/(m2·d)] was tested according to ASTM E96. The WVTR permeability properties were tested and shown improved after the application of shellac coating, shown in Table 8:

TABLE 8

| Layer | WVTR [g/(m2 · d)] |
|---|---|
| No coating | >500 (failed) |
| PBS coated with shellac | 250 |

Sheet #76: A three layered biodegradable sheet was prepared using co-extrusion of PBS, a hydrophobic compound, consisting of about 60% w/w PLA, and 40% w/w PCL, and PBSA that was prepared as follows.
A. Melt extrusion compounding stage was performed as abovementioned for the hydrophobic compound:
B. Cast co-extrusion stage:
1. The PBS, hydrophobic compound and PBSA were dried overnight at a temperature of 40° C. in a desiccant dryer;
2. The materials, 1 kg of PBS, 2 kg of hydrophobic compound and 1 kg PBSA were placed into a Randcastle coextrusion line set to the following profile:
3. Extruders 160-180-185° C.-185° C.—Adaptor; 185° C.—feedblock; Die—185° C.;
4. Screw speed: 80 rpm; and Head pressure 450 bar.

The three layered Sheet #76 consists of the following three layers:
Layer 1 (5-10 microns thick): consisting of about 100% w/w PBS;
Layer 2 (20-30 microns thick): consisting of about 60% w/w PLA and about 40% w/w PCL;
Layer 3 (5-15 microns thick): consisting of about 100% w/w PBSA;

Sheet #76 was next tested for its mechanical properties (ASTM D882), heat seal (ASTM F2029) and water vapor transmittance rate (WVTR; ASTM E96), shown in Tables 9A and 9B:

TABLE 9A

| Tensile | | | | | |
|---|---|---|---|---|---|
| Young's Modulus (MPa) | | Stress at Break (MPa) | | Percentage Strain at Break | |
| MD | TD | MD | TD | MD | TD |
| 1,371 | 1,333 | 29 | 21 | 3 | 84 |

MD and TD denote for machine direction and trans-machine direction WVTR was 35.4 [g/(m2 · d)]

TABLE 9B

| Heat Seal | | |
|---|---|---|
| Sealing Temp - 1 sec (° C.) | Average Seal strength N/25 mm | min-max seal strength |
| 80-120 | 27 | 26-28 |

Sheet #76 may be prepared using up to 5% impact modifier (plasticizer) in the co-extrusion process, such as PCL. In addition, the hydrophobic compound could be prepared in a range of proportions between PLA and PCL, using the same aforementioned procedure:
Layer 1 (5-10 microns thick): consisting of about 100% w/w PBS (with up to 5% impact modifier (plasticizer));
Layer 2 (20-30 microns thick): consisting of about 55%-65%% w/w PLA and about 35%-45% w/w PCL;
Layer 3 (5-15 microns thick): consisting of about 100% w/w PBSA (with up to 5% impact modifier (plasticizer)).

Sheet #77 A three-layered biodegradable sheet consisting of compound A, PBAT and PBSA was prepared as follows:
A. Melt extrusion compounding stage of compound A was prepared as mentioned above:
1. 50 gr PLA and 150 gr PBSA were dried overnight at a temperature of 50° C. under vacuum;
2. the dried polymers were dry blended and placed in a two screw PRISM compounder;
3. the polymers were melt extruded in the PRISM compounder set to the following profile:
i) temperature profile: 170-175-180-185-190° C. (the Die is set to 190° C.);
ii) screw speed: 250 rpm; and
iii) pressure: 15-25 bar;
to generate "compound A"
B) Cast Co-Extrusion Stage:
1. The materials, 300 gr PBSA, 500 gr of PBAT and 200 gr of compound A were dried overnight at a temperature of 50° C. under vacuum on a Shini SCD-160U-120H dryer;
2. The materials were placed each into a different extruder/layer in a Collin co-extrusion line set to the following profile:
Extruder A) 190-200-220° C.-200° C.—Adaptor; 220° C.—feedblock; Die—210° C.; screw speed: 80 rpm
Extruder B) 190-220-230° C.-200° C.—Adaptor; 230° C.—feedblock; Die—230° C.; screw speed: 45 rpm
Extruder C) 190-200-220° C.-200° C.—Adaptor; 220° C.—feedblock; Die—210° C.; screw speed: 80 rpm
Head pressure 50 bar.

A 35 microns thick 3-layer sheet was generated having the following layers:
Layer 1 (10-20 microns thick): consisting of about 100% w/w PBSA;
Layer 2 (15-25 microns thick): consisting of about 100% w/w PBAT and
Layer 3 (5-10 microns thick): consisting of about 75% w/w PBSA and about 25% w/w PLA.

Sheet #78:
Sheet #75 (about 25 microns thick) was co-extruded, coated with a thin film coating of shellac at 3 g/m² concentration on the PBS side, and then laminated, using biodegradable water-based adhesive (e.g. Epotal 2 g/m²) to the co-extruded Sheet #70 that previously underwent vacuum metallization using aluminum on the hydrophobic compound side. This structure was then laminated to Sheet #77, resulting in the following structure:

Layer 1 (5 microns thick): consisting of about 100% w/w PLA

Layer 2 (14 microns thick): consisting of about 100% w/w PBS;

Layer 3; (6 microns thick): consisting of about 100% w/w PBS with shellac;

Adhesive Layer

Layer 1 (15 microns thick): consisting of about 60% w/w PLA and about 40% w/w PCL;

Layer 2 (20 microns thick): consisting of about 100% w/w PBS+metallization Adhesive layer Layer 1 (11 microns thick): consisting of about 100% w/w PBSA;

Layer 2 (18 microns thick): consisting of about 100% w/w PBAT and

Layer 3 (6 microns thick): consisting of about 75% w/w PBSA and about 25% w/w PLA.

Example 10: Biodegradable Sheets Coated with Nanocrystalline Cellulose

Biodegradable sheets were pre-treated with plasma and thereafter coated with commercial nanocrystalline cellulose as follows.

Sheet #70, 71, 75 and 76 underwent plasma treatment using high vacuum oven and various gas flow, to increase the hydrophilicity of the surface. The plasma treatment thickness is about several nanometers and its impact on the surface hydrophilicity is monitored by contact angle measurements (lower contact angle suggests better hydrophilic affinity to the surface). Sheets were treated several times with plasma and the contact angle reduced from approx. 99 to 27 (Sheet #70), 35 (Sheet #75), 46 (Sheet #71) and 49 (Sheet #76).

Next, 100 microns of commercial nanocrystalline cellulose were coated on Sheet #70, 71, 75 and 76 using an automatic roller coater.

The teachings illustratively described herein may suitably be practiced in the absence of any element or elements, limitation or limitations, not specifically disclosed herein. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise indicated.

Although the above examples have illustrated particular ways of carrying out embodiments of the invention, in practice persons skilled in the art will appreciate alternative ways of carrying out embodiments of the invention, which are not shown explicitly herein. It should be understood that the present disclosure is to be considered as an exemplification of the principles of this invention and is not intended to limit the invention to the embodiments illustrated.

Those skilled in the art will recognize, or be able to ascertain using no more than routine experimentation, equivalents of the specific embodiments of the invention described herein. Such equivalents are intended to be encompassed by the following claims.

What is claimed is:

1. A biodegradable sheet comprising three polymer layers,
wherein a first polymer layer comprises a mixture comprising PBSA at a concentration of from about 65 to about 85% (w/w) of the mixture and PLA at a concentration of from about 15 to about 35% (w/w) of the mixture;
wherein a second polymer layer comprises PBSA; and
wherein a third polymer layer consists of 100% (w/w) PBAT, wherein the PBAT consists of butylene, adipate, and terephthalate units,
wherein said third polymer layer is situated between said first polymer layer and said second polymer layer.

2. The biodegradable sheet according to claim 1, wherein said first polymer layer comprises PBSA at a concentration of from about 75% (w/w) to about 85% (w/w) of said mixture and PLA at a concentration of from about 15% (w/w) to about 25% (w/w) of said mixture.

3. The biodegradable sheet according to claim 1, wherein at least one layer of said three polymer layers further comprises a plasticizer.

4. The biodegradable sheet according to claim 3, wherein said plasticizer comprises PCL.

5. The biodegradable sheet according to claim 3, wherein said plasticizer is present at a concentration of from about 0.05 to about 5% (w/w) of said at least one layer of said three polymer layers.

6. The biodegradable sheet according to claim 1, further comprising at least one coating layer on one or both surfaces of said at least one layer of said three polymer layers.

7. The biodegradable sheet according to claim 6, wherein said at least one coating layer comprises a coating selected from the group consisting of shellac, cellulose and copolymer of vinylidene chloride (PVDC).

8. The biodegradable sheet according to claim 6, wherein said at least one coating layer comprises a metal coating layer and further comprises an additional coating layer selected from the group consisting of shellac, cellulose and PVDC.

9. The biodegradable sheet according to claim 8, wherein said additional coating layer comprises shellac.

10. The biodegradable sheet according to claim 1, prepared by co-extrusion of three polymer layers.

11. A multilayered laminated structure comprising the biodegradable sheet according to claim 1, and at least one additional layer attached to the biodegradable sheet by lamination.

12. The multilayered laminated structure according to claim 11, comprising a coating layer on a surface between said biodegradable sheet and said at least one additional layer.

13. A biodegradable sheet consisting of three polymer layers,
wherein a first polymer layer consists of a mixture of PBSA and PLA, wherein PBSA is present at a concentration of about 75% (w/w) of the mixture and PLA is present at a concentration of about 25% (w/w) of the mixture;
wherein a second layer consists of PBSA; and
wherein a third layer consists of PBAT, wherein the PBAT consists of butylene, adipate, and terephthalate units,
wherein said third polymer layer is situated between said first polymer layer and said second polymer layer.

14. A biodegradable sheet comprising three polymer layers,
wherein a first polymer layer comprises a mixture comprising PBSA at a concentration of about 85% (w/w) of the mixture and PLA at a concentration of about 15% (w/w) of the mixture;

wherein a second polymer layer comprises a mixture comprising PBSA at a concentration of about 85% (w/w) of the mixture and PLA at a concentration of from about 15% (w/w) of the mixture; and wherein a third polymer layer consists of 100% (w/w) PBAT, wherein the PBAT consists of butylene, adipate, and terephthalate units, wherein said third polymer layer is situated between said first polymer layer and said second polymer layer.

* * * * *